(12) United States Patent
Faeulhammer et al.

(10) Patent No.: US 12,499,633 B1
(45) Date of Patent: Dec. 16, 2025

(54) BODY-MOUNTED SENSOR FOR IMPROVED POSE FORECASTING

(71) Applicant: Snap Inc., Santa Monica, CA (US)

(72) Inventors: Thomas Faeulhammer, Vienna (AT); Matthias Kalkgruber, Vienna (AT); Thomas Muttenthaler, vienna (AT); Daniel Wolf, Mödling (AT)

(73) Assignee: Snap Inc., Santa Monica, CA (US)

( * ) Notice: Subject to any disclaimer, the term of this patent is extended or adjusted under 35 U.S.C. 154(b) by 177 days.

(21) Appl. No.: 18/453,822

(22) Filed: Aug. 22, 2023

(51) Int. Cl.
| | |
|---|---|
| *G06T 19/00* | (2011.01) |
| *G02B 27/01* | (2006.01) |
| *G06F 3/00* | (2006.01) |
| *G06F 3/01* | (2006.01) |
| *G06F 3/0346* | (2013.01) |
| *G06V 10/25* | (2022.01) |

(52) U.S. Cl.
CPC ........ *G06T 19/006* (2013.01); *G02B 27/0172* (2013.01); *G06F 3/014* (2013.01); *G06F 3/0346* (2013.01); *G06V 10/25* (2022.01)

(58) Field of Classification Search
CPC ... G06T 19/006; G02B 27/0172; G06F 3/014; G06F 3/0346; G06V 10/25
See application file for complete search history.

(56) References Cited

U.S. PATENT DOCUMENTS

| | | | |
|---|---|---|---|
| 2015/0002542 A1* | 1/2015 | Chan | G06T 3/02 345/633 |
| 2017/0206712 A1* | 7/2017 | Petrovskaya | G06F 3/0346 |
| 2019/0228330 A1* | 7/2019 | Kaifosh | G06F 3/014 |
| 2019/0318501 A1* | 10/2019 | Balan | A63F 13/212 |
| 2021/0118357 A1* | 4/2021 | Kuwahara | G06F 3/147 |
| 2021/0374918 A1* | 12/2021 | Margolis | G09G 3/003 |
| 2022/0035441 A1* | 2/2022 | Yu | G06F 3/011 |
| 2023/0048398 A1* | 2/2023 | Mounier | G06F 3/011 |
| 2023/0176659 A1* | 6/2023 | Lee | G06V 10/28 345/156 |
| 2023/0214027 A1* | 7/2023 | Erivantcev | G06F 3/017 345/156 |

OTHER PUBLICATIONS

Ting Kwok Chan, Ying Kin Yu, Ho Chuen Kam, and Kin Hong Wong, Robust Hand Gesture Input Using Computer Vision, Inertial Measurement Unit (IMU) and Flex Sensors, 2018, 2018 IEEE International Conference on Mechatronics, Robotics and Automation (ICMRA), pp. 95-99. (Year: 2018).*

* cited by examiner

*Primary Examiner* — Jeffery A Brier
(74) *Attorney, Agent, or Firm* — Schwegman Lundberg & Woessner, P.A.

(57) ABSTRACT

In examples described herein, a sensor external to an extended reality (XR) device is connected to an extremity of a user of the XR device. The external sensor is communicatively coupled to the XR device. The XR device captures image data comprising one or more images of the extremity of the user. The XR device accesses external tracking data generated by the external sensor. A forecast of a pose of the extremity is generated based on the image data and the external tracking data. The forecast may be used for tracking of the extremity or to render virtual content for presentation to the user.

20 Claims, 12 Drawing Sheets

BODY-MOUNTED SENSOR FOR IMPROVED POSE FORECASTING

TECHNICAL FIELD

Subject matter disclosed herein relates generally to object tracking in the context of extended reality (XR) technology. More specifically, but not exclusively, the subject matter relates to the use of a body-mounted sensor to facilitate pose forecasting performed by an XR device.

BACKGROUND

Some XR devices use hand gestures or hand movements as inputs. For example, an augmented reality (AR) device is a type of XR device that enables a user to observe a real-world scene while simultaneously seeing virtual content that may be aligned to objects, images, or environments in the field of view of the AR device. A user may interact with the AR device using hand gestures instead of a traditional input device, such as a touchpad or controller. However, this requires swift and accurate hand tracking.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
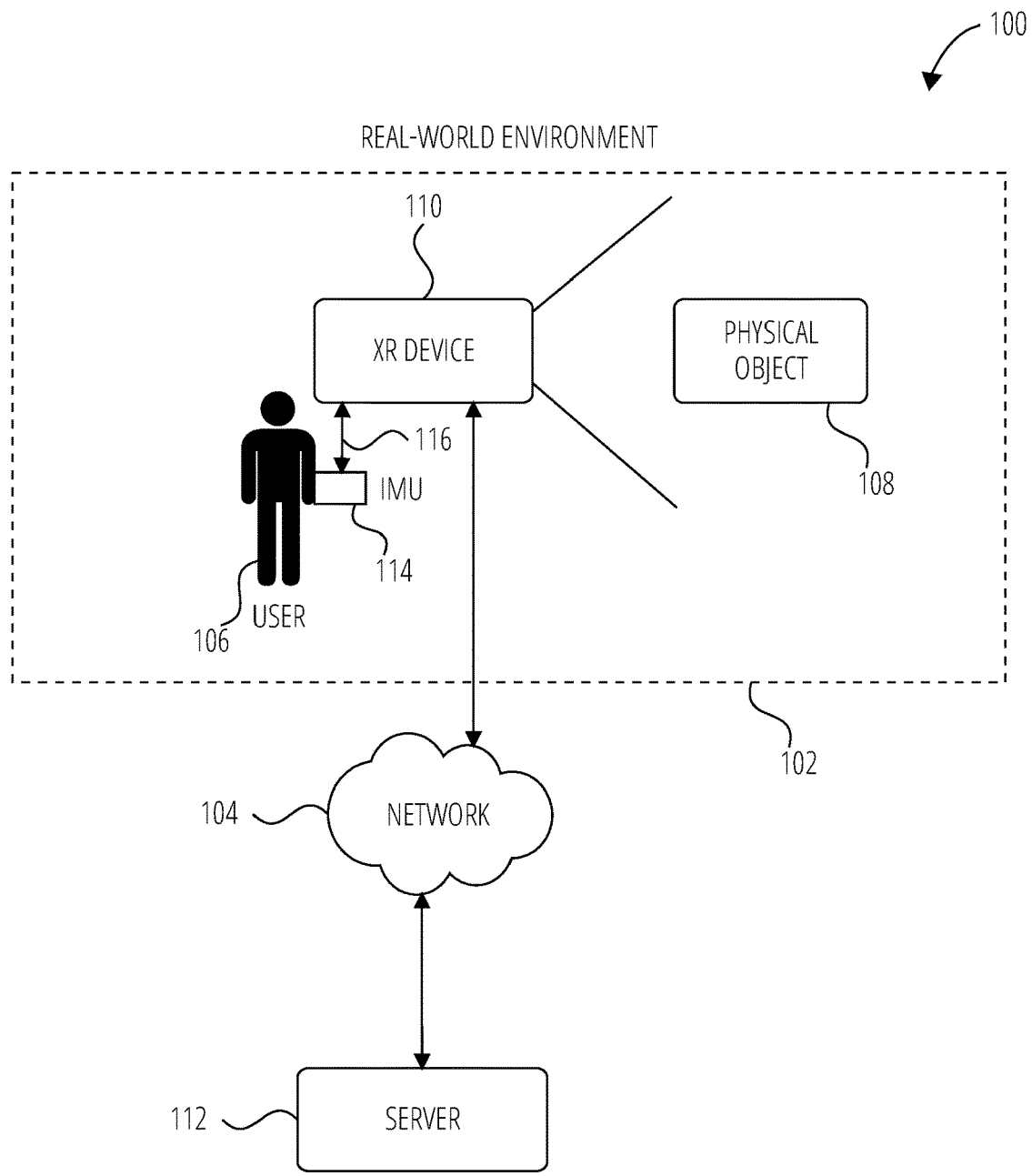
FIG. 1 is a block diagram illustrating a network environment for operating an XR device, according to some examples, in which the XR device is communicatively coupled to a server and to an external sensor.

The description that follows describes systems, methods, devices, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

The term "augmented reality (AR)" is used herein to refer to an interactive experience of a real-world environment where physical objects or environments that reside in the real world are "augmented" or enhanced by computer-generated digital content (also referred to as virtual content or synthetic content). An AR device can enable a user to observe a real-world scene while simultaneously seeing virtual content that may be aligned to objects, images, or environments in the field of view of the AR device. AR can also refer to a system that enables a combination of real and virtual worlds, real-time interaction, and 3D registration of virtual and real objects. A user of an AR system can perceive virtual content that appears to be attached or interact with a real-world physical object. The term "AR application" is used herein to refer to a computer-operated application that enables an AR experience.

The term "virtual reality (VR)" is used herein to refer to a simulation experience of a virtual world environment that is distinct from the real-world environment. Computer-generated digital content is displayed in the virtual world environment. A VR device can thus provide a more immersive experience than an AR device. The VR device may block out the field of view of the user with virtual content that is displayed based on a position and orientation of the VR device. VR also refers to a system that enables a user of a VR system to be completely immersed in the virtual world environment and to interact with virtual objects presented in the virtual world environment.

In general, AR and VR devices are referred to as XR devices, and related systems are referred to as XR systems. While examples described in the present disclosure focus primarily on XR devices that provide an AR experience, it will be appreciated that at least some aspects of the present disclosure may also be applied to other types of XR experiences.

The term "user session" is used herein to refer to an operation of an application during periods of time. For example, a user session may refer to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In other examples, the session starts when the user runs or starts an AR application, or runs or starts a particular feature of the AR application, and stops when the user ends the AR application or stops the particular features of the AR application.

The term "IMU" (Inertial Measurement Unit) is used herein to refer to a device or component that can report on the inertial status of a moving body, including the acceleration, velocity, orientation, and/or position of the moving body. An IMU may enable tracking of movement of a body by integrating the acceleration and the angular velocity measured by the IMU. The values obtained from one or more gyroscopes of the IMU can be processed to obtain the pitch, roll, and heading of the IMU and, therefore, of the body with which the IMU is associated. Signals from one or more accelerometers of the IMU can be processed to obtain velocity and displacement of the IMU.

The term "SLAM" (Simultaneous Localization and Mapping) is used herein to refer to a system used to understand and map a physical environment in real-time. It uses sensors such as cameras, depth sensors, and IMUs to capture data about the environment and then uses that data to create a map of the surroundings of a device while simultaneously determining the device's location within that map. This allows, for example, an XR device to accurately place digital objects in the real world and track their position as a user moves and/or as objects move.

As mentioned, some XR devices track a body part of a user, such as a hand, to provide an XR experience. For example, an XR device may be a head-mounted device that tracks the hand of the user to place virtual content in suitable positions relative to the hand and that enables the user to perform hand gestures to interact with the XR device.

An XR device may capture images of a user's hand and use the images (often together with other sensor data, such as depth information or IMU data) to track the position and orientation of the hand. However, there is a delay between the time when an image (e.g., a particular video frame) is taken and the time when a result is available for presentation, e.g., the time when virtual content is shown on a display of the XR device. In the context of AR devices, this delay can be referred to as "AR lag." To illustrate this delay, the following simplified example can be considered:

An image that depicts the hand of the user is captured by a camera of the XR device at time t=0. The hand is in a certain position and orientation at time t=0.

The XR device then processes the image and renders virtual content for presentation to the user based on the position and orientation of the hand as captured in the image of time t=0. For example, the XR device may render a virtual apple to be presented as overlaid on the palm of the user's hand.

The processing and rendering operations take 100 ms to complete.

At time t=100 ms, the virtual content is then presented via the display of the XR device.

However, in the intervening 100 ms since the image was captured, the user's hand moved relative to the XR device, thus changing its position and/or orientation relative to the initial (t=0) position and orientation.

As a result, the virtual content is not rendered in the correct position and/or orientation, e.g., the user sees the virtual apple at an edge of the hand instead of centered in the palm of the hand.

Pose forecasting is a technique that may be employed to compensate for the aforementioned lag. Pose forecasting may be used as part of predictive tracking to forecast the position and/or orientation of an object in subsequent frames or at future points in time. In this context, a "prediction" refers, for example, to a predicted position or pose of an object at a future point in time.

Predictive tracking can reduce perceived latency in XR systems by "anticipating" the future position of a tracked object, such as a hand or head of the user, based on its current and past states. This prediction is then used to render the virtual content, compensating for the time it takes to process and display the image.

For example, the XR device may use a computer vision algorithm to generate a display-time forecast of the pose of the relevant object, e.g., the hand. The XR device then utilizes the display-time forecast (instead of the pose corresponding to the time of capturing the image) to render the virtual content. Traditional pose forecasting can improve the accuracy of the rendering of virtual content to some extent. However, perceived lag remains an issue that can reduce accuracy, quality, or realism and detract from a user's XR experience. It would thus be technically beneficial to provide more accurate pose forecasts.

Examples described herein provide for an external sensor to be connected to a body part of a user, e.g., an extremity of the user, for more accurate pose forecasting. In some examples, the user wears a head-mounted XR device and the external sensor is connected to the hand of the user, e.g., worn on a finger or wrist. The external sensor is communicatively coupled to the XR device and provides external tracking data, e.g., IMU data, to the XR device. The XR device is then able to use the external tracking data together with on-board sensor data, such as images of the hand, to generate pose forecasts.

In some examples, a method performed by an XR device includes capturing image data comprising one or more images of an extremity of a user, and accessing external tracking data generated by an external sensor that is connected to the extremity of the user and communicatively coupled to the XR device. The method may include generating, based on the image data and the external tracking data, a forecast of a pose of the extremity.

As mentioned, the extremity may be a hand of the user. The external sensor may be connected so as to move together with the hand or arm of the user relative to the XR device.

In some examples, the external sensor is connected to the extremity at an anchor point. The XR device may generate an anchor point forecast and use the anchor point forecast together with image-based data to forecast the pose of the extremity, e.g., the XR device may reconstruct the pose of the rest of the hand using the anchor point forecast. For example, the external sensor may be connected to a hand or wrist of the user at a known or predetermined part. The anchor point forecast may then substantially correspond to a forecast for the known or predetermined part.

In some examples, generation of the anchor point forecast includes fusing the external tracking data with the image data, or fusing external sensor-based predictions with image-based predictions.

The external sensor may be an external IMU. In such cases, the external tracking data includes external IMU data, e.g., inertial data. In some examples, the XR device may generate the external tracking data based on the inertial data.

Various types of external sensors may be utilized. For example, where the extremity is a hand of the user, the external sensor may be a finger-worn sensor, a wrist-worn sensor, or a hand-held mobile device that is configured to provide the external tracking data to the XR device.

While examples described herein focus primarily on hand tracking and the connecting or mounting of an external sensor to the hand of the user, it is noted that techniques described herein may be used with respect to other body parts of the user and applications are thus not limited to hand tracking.

In some examples, pose is predicted in six dimensions, e.g., along six degrees of freedom, also referred to as 6DOF. The term "6DOF" is used herein in the context of tracking to the tracking of the pose of an object along three degrees of translational motion and three degrees of rotational motion. Accordingly, the XR device may generate a 6DOF forecast of the pose of the extremity, the anchor point, or both.

Examples described herein provide for the external sensor to capture information at a higher sampling rate than one or more cameras of the XR device. For example, the external sensor may be an IMU that obtains new IMU data more frequently than the camera of the XR device samples each new image. Further, in some examples, the time it takes to process data from the external sensor is less than the time it takes to process newly captured images. In other words, the image data used in pose forecasting has a higher processing latency than the external tracking data used in the pose forecast.

Accordingly, examples described herein may enable an XR device to forecast the pose of the external sensor, and thus also the connected extremity, with a high degree of accuracy and high speed relative to pose forecasting that relies solely on captured images. For example, the XR device may be paired with an external IMU that enables the XR device to track or estimate changes in pose more rapidly than would have been the case in the absence of the external IMU.

Once the XR device has generated a forecast of the pose of the extremity, the XR device is able to use the forecast to render virtual content for presentation to the user. For example, the XR device may cause presentation of the virtual content via a display component of the XR device, with the virtual content being positioned based on the forecast of the pose of the extremity, e.g., a virtual apple overlaid on the extremity.

Systems, methods, or devices described herein may improve the functionality of an XR device or an XR system by providing improved pose forecasting functionality, improved tracking capabilities, and/or more accurate content rendering. System, methods, or devices described herein may thus alleviate technical challenges associated with addressing latency caused by moving hands (or other tracked objects), at least to some extent.

External tracking data obtained from an external sensor, such as an IMU mounted to the extremity of the user, may provide further technical advantages that can reduce computing resource requirements associated with the XR device connected to the external sensor. In some examples, the external tracking data may be used to determine whether an object of interest (e.g., the user's hand) is in a field of view, allowing the XR device to stop or reduce image processing when no hand tracking is needed. In some examples, the external tracking data may be used to determine a region of interest within a camera field of view of the XR device, or a particular camera or subset of cameras to use for object tracking image processing, thus reducing image-related computing load. Examples of computing resources that may be saved or reduced include processor cycles, network traffic, memory usage, data storage capacity, power consumption, network bandwidth, or cooling capacity.

Other technical features may be readily apparent to one skilled in the art from the following figures, descriptions, examples, and claims.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system may be or include a cloud-based server system that provides additional information, such as virtual content (e.g., two-dimensional or three-dimensional models of virtual objects, or augmentations to be applied as virtual overlays onto images depicting real-world scenes) to the XR device 110.

A user 106 operates the XR device 110. The user 106 may be a human user (e.g., a human being), a machine user, or any suitable combination thereof (e.g., a human assisted by a machine or a machine supervised by a human). The user 106 is not part of the network environment 100, but is associated with the XR device 110. For example, where the XR device 110 is a head-wearable apparatus, the user 106 wears the XR device 110 during a user session.

The user 106 operates an application of the XR device 110, referred to herein as an AR application. The AR application may be configured to provide the user 106 with an experience triggered or enhanced by a physical object 108, such as a two-dimensional physical object (e.g., a picture), a three-dimensional physical object (e.g., a statue, another person, a hand of the user 106), a location (e.g., at factory), or any reference point (e.g., perceived corners of walls or furniture, or Quick Response (QR) codes) in the real-world physical environment. For example, the user 106 may point a camera of the XR device 110 to capture an image of the physical object 108 and a virtual overlay may be presented over the physical object 108 via the display. Experiences may also be triggered or enhanced by a hand or other extremity of the user 106, e.g., the XR device 110 may detect and respond to hand gestures.

The XR device 110 includes tracking components (not shown in FIG. 1). The tracking components track the pose (e.g., position and orientation) of the XR device 110 relative to the real-world environment 102 using image sensors (e.g., depth-enabled 3D camera, and image camera), inertial sensors (e.g., gyroscope, accelerometer, or the like), wireless sensors (e.g., Bluetooth™ or Wi-Fi™), a Global Positioning System (GPS) sensor, and/or audio sensor to determine the location of the XR device 110 within the real-world environment 102. The tracking components also track the pose of the physical object 108 or other objects of interest, such as the hand of the user 106 to respond to hand gestures or to render virtual content relative to the hand.

In some examples, the server 112 may be used to detect and identify the physical object 108 based on sensor data (e.g., image and depth data) from the XR device 110, and determine a pose of the XR device 110 and the physical object 108 based on the sensor data. The server 112 can also generate a virtual object based on the pose of the XR device 110 and the physical object 108.

The server 112 may communicate a virtual object to the XR device 110. The XR device 110 or the server 112, or both, can also perform image processing, object detection, and object tracking functions based on images captured by the XR device 110 and one or more parameters internal or external to the XR device 110. The object recognition, tracking, and AR rendering can be performed on either the XR device 110, the server 112, or a combination of the XR device 110 and the server 112. Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

In some examples, the user 106 wears an external sensor. In FIG. 1, the user 106 wears an external sensor in the example form of an IMU 114 on an extremity, e.g., a hand or wrist. For example, and as will be described in more detail with reference to FIG. 5, the XR device 110 may be a head-mounted device, with the IMU 114 being worn on a hand of the user 106.

It is noted that the IMU 114 of FIG. 1 is a non-limiting example and other external sensors that can provide external tracking data to facilitate tracking a pose of an extremity may also be used. The term "IMU" should be interpreted broadly in this context, and may include a dedicated IMU, or a device or component that includes an IMU (or can perform IMU-related functions) but can also perform other functions, such as a mobile phone, a smartwatch, an AR controller, or the like.

The IMU 114 is "external" in the sense that it is not an on-board sensor of the XR device 110. Rather, the IMU 114 is external to and communicatively coupled with the XR device 110 so as to form part of the network environment 100.

The IMU 114 tracks motion of the extremity of the user 106 to which it is attached, in use. The XR device 110 may receive external tracking data from the IMU 114 to facilitate pose forecasting, e.g., forecasting a pose of the hand of the user 106.

The IMU 114 may be connected, attached, or mounted to the extremity, or held by or in proximity to the extremity, such that the IMU 114 substantially moves with the extremity. For example, the IMU 114 may be provided in the form of a ring that is worn on a finger of the user 106, may be strapped to the extremity, worn as a wrist-worn device (e.g., a smartwatch), or may be a handheld device.

The IMU 114 need not be directly attached to the extremity of interest. For example, the IMU 114 may be wrist-worn, enabling a pose of the wrist of the user 106 to be tracked. Where hand features, such as joint landmarks, are of interest, hand features may be mapped and/or calibrated to the position of the IMU 114 on the wrist.

The IMU 114 may include tracking components or sensors, such as an accelerometer, gyroscope, and/or magnetometer. An accelerometer may be used to determine in which direction the extremity is speeding up or slowing down. The gyroscope may be used to track rotation. The magnetometer can facilitate determining the orientation of the extremity. Data from these sensors may be used to track the pose of the IMU 114 and thus the relevant extremity of the user 106.

The XR device 110 communicates with the IMU 114 via any suitable communication protocol, e.g., a wireless communication protocol, such as Wi-Fi, Bluetooth, Local Area Network, Radio Frequency (RF), or Ultra-wideband (UWB). The IMU 114 may thus include a suitable communication component or module to enable the IMU 114 to establish a wireless communication link 116 with the XR device 110.

In some examples, a tracking mode of the IMU 114 may be activated by the XR device 110, e.g., by transmitting an appropriate control signal via the communication link 116. In some examples, the IMU 114 only transmits measurements or tracking data to the XR device 110 when in the tracking mode. The IMU 114 may have multiple tracking modes, e.g., a high-power tracking mode in which tracking data is obtained and/or streamed to the XR device 110 at a high rate and a low-power tracking mode in which tracking data is obtained and/or streamed to the XR device 110 at a lower rate.

In use, according to some examples, the XR device 110 accesses external tracking data from the IMU 114 by receiving a real-time stream of measurement data (e.g., accelerometer, gyroscope, and magnetometer data) or processed tracking data from the IMU 114 via a wireless communication link 116. In some examples, the IMU 114 transmits "raw" sensor data, e.g., acceleration data and rotation data, to the XR device 110. In other examples, the IMU 114 may process the "raw" data, e.g., to calculate pose data, before sending the sensor data to the XR device 110. The term "external tracking data" may thus refer to the "raw" sensor data or to further processed data, e.g., pose data indicative of the pose of the IMU 114. The XR device 110 may process "raw" data, such as inertial data, from the IMU 114, to obtain the external tracking data in the form or format required. Sensor fusion algorithms may be used to combine data from the different components or sensors to produce accurate tracking data.

As alluded to above, the IMU 114 may perform certain processing operations, e.g., preprocessing, prior to transmitting the external tracking data to the XR device 110. Preprocessing operations may include, for example, one or more of data accumulation, data compression, or data summarization. In some examples, the preprocessing operations performed by the IMU 114 may include pre-integration. The term "pre-integration" refers to a technique used to improve the efficiency, robustness, or management of state estimation in the IMU context. An IMU commonly generates a large amount of high-frequency data, e.g., from its accelerometers and gyroscopes. This high-frequency data may cause difficulties, such as a strain on computing resources if each sample is to be processed individually. Pre-integration may involve integrating several IMU measurements over a period of time into a single measurement that represents a change in state (e.g., position, velocity, and orientation) over that period. Pre-integration may be performed in such a manner that it does not depend on the initial conditions at the start of the pre-integration period. This may be achieved by integrating measurements in a relative way, e.g., in the local coordinate frame of the IMU, and then formulating a correction that adjusts for the rotation of this frame during the pre-integration period when the pre-integrated measurement is actually used. In this way, IMU samples can be more efficiently processed by accumulating them between larger time steps.

The IMU 114 may include one or more processing components for performing processing functions, such as the functions mentioned above. Certain processing or pre-processing operations may be performed by the IMU 114, while others may be offloaded to the XR device 110 (or to a server-side component, e.g., where the XR device 110 is connected to the server 112). The IMU 114 may also include a battery (e.g., a rechargeable battery) or other component for powering the IMU 114.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

In FIG. 1, the IMU 114 communicates with the XR device 110 via the communication link 116 and the XR device 110 communicates with the server 112 via the network 104. However, in other examples, the IMU 114 may communicate with the server 112, e.g., via the network 104, to transmit external tracking data to the server 112 or to receive control instructions from the server 112.

Figure 2:
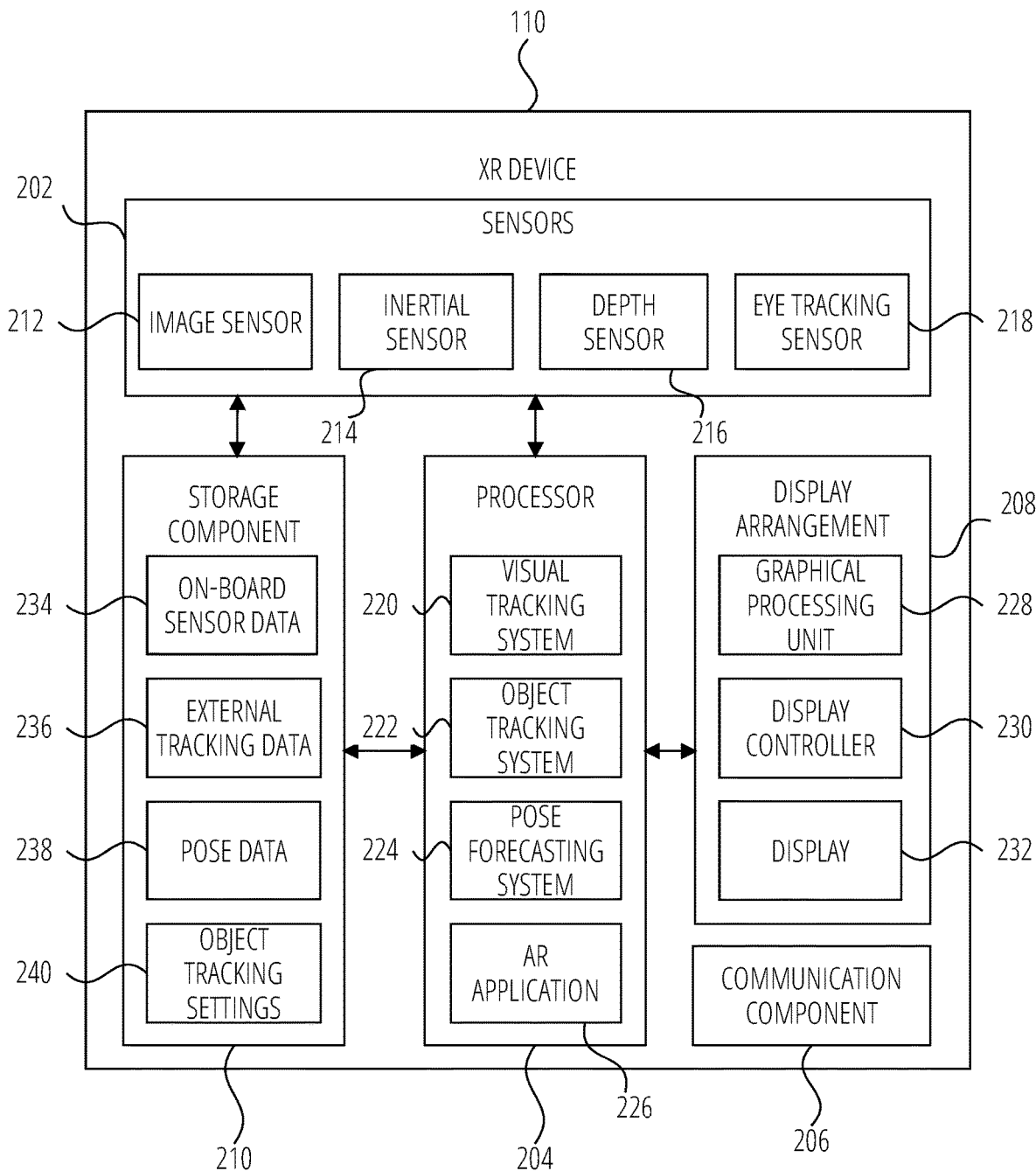
FIG. 2 is a block diagram illustrating components of an XR device, according to some examples.

FIG. 2 is a block diagram illustrating components (e.g., parts, modules, or systems) of the XR device 110, according to some examples. The XR device 110 includes sensors 202, a processor 204, a communication component 206, a display arrangement 208, and a storage component 210. It will be appreciated that FIG. 2 is not intended to provide an exhaustive indication of components of the XR device 110.

The sensors 202 include one or more image sensors 212, one or more inertial sensors 214, one or more depth sensors 216, and one or more eye tracking sensors 218. The image sensors 212 may include, for example, one or more of a color camera, a thermal camera, a depth sensor, and one or more grayscale, global shutter tracking cameras. The inertial sensor 214 may include one or more of a gyroscope, accelerometer, and a magnetometer. In some examples, the inertial sensor 214 includes one or more IMUs.

The depth sensor 216 may include one or more of a structured-light sensor, a time-of-flight sensor, passive stereo sensor, and an ultrasound device. The eye tracking sensor 218 is configured to monitor the gaze direction of the user, providing data for various applications, such as adjusting the focus of displayed content or determining a zone or object which the user 106 may be looking at or interested in. The XR device 110 may include one or multiple of these sensors, e.g., image-based or video-based tracking sensors, such as infrared eye tracking sensors or corneal reflection tracking sensors.

Other examples of sensors 202 include a proximity or location sensor (e.g., near field communication, GPS, Bluetooth™, Wi-Fi™), an audio sensor (e.g., a microphone), or any suitable combination thereof. It is noted that the sensors 202 described herein are for illustration purposes and possible sensors of an XR device are thus not limited to the ones described above.

The processor 204 implements or executes a visual tracking system 220, an object tracking system 222, a pose forecasting system 224, and an AR application 226. The visual tracking system 220 estimates and continuously tracks a pose of the XR device 110. For example, the visual tracking system 220 uses data from the image sensor 212 and the inertial sensor 214 to track a location and pose of the XR device 110 relative to a frame of reference (e.g., real-world environment 102 or physical object 108).

In some examples, the visual tracking system 220 uses data from the sensors 202 to determine the 6DOF pose of the XR device 110. The visual tracking system 220 continually gathers and uses updated sensor data describing movements of the XR device 110 to determine updated poses of the XR device 110 that indicate changes in the relative position and orientation of the XR device 110 from the physical objects (real-world objects) in the real-world environment 102. The visual tracking system 220 may provide the three-dimensional pose of the XR device 110 to the object tracking system 222, the pose forecasting system 224, the AR application 226, or a graphical processing unit 228 of the display arrangement 208.

A SLAM system may be used, e.g., implemented by the processor 204, to understand and map a physical environment in real-time. This allows the XR device 110, for example, to accurately place digital objects overlaid, or superimposed, on the real world and track their position as a user moves and/or as objects move. The XR device 110 may include a "VIO" (Visual-Inertial Odometry) system that combines data from the inertial sensor 214 and image sensor 212 to estimate the position and orientation of an object in real-time. In some examples, a VIO system may form part of a SLAM system, e.g., to perform the "Localization" function of the SLAM system.

The object tracking system 222, together with the pose forecasting system 224, enables the detection and tracking of an object, e.g., the physical object 108, or a hand of a user. The object tracking system 222 may include a computer-operated application or system that enables a device or system to detect and track visual features identified in images captured by one or more image sensors 212, such as one or more cameras. In some examples, the object tracking system 222 builds a model of a real-world environment based on the tracked visual features. An object tracking system, such as the object tracking system 222, may implement one or more object tracking machine learning models to track an object in the field of view of a user during a user session. The object tracking machine learning model may comprise a neural network trained on suitable training data to identify and track objects in a sequence of frames captured by the XR device 110. The object tracking system 222 may analyze an object's appearance, motion, landmarks, and/or other features to detect the object and estimate its location or pose in subsequent frames.

The pose forecasting system 224 works with the object tracking system 222 to provide pose forecasts, e.g., hand pose forecasts. The pose forecasting system 224 may implement an image-based tracker to predict the future pose of an object, e.g., landmarks of the hand, such as joints. The image-based tracker may predict the pose of the hand of the user 106 (e.g., what the pose will be at a specified future point in time) by analyzing movement of the hand across a series of frames.

The pose forecasting system 224 may further utilize external tracking data from the external IMU 114 to generate improved pose forecasts. The XR device 110 receives the external tracking data from the IMU 114 via the communication component 206. The communication component 206 may, for example, include a Bluetooth™ chip or Wi-Fi™ module, that allows the XR device 110 to establish the communication link 116 and communicate with the IMU 114 as described with reference to FIG. 1.

Together with the pose forecasting system 224, the object tracking system 222 may thus use both on-board sensor data 234 (e.g., captured images and depth information from the sensors 202) and external tracking data 236 (e.g., IMU data from the IMU 114) to generate pose forecasts and track objects, e.g., the hand of the user 106.

Referring specifically to hand tracking, the XR device 110 may utilize a combination of computer vision techniques and/or machine learning models to perform hand tracking. The XR device 110 may implement one or more computer vision algorithms to identify or detect the hand in images captured by the image sensors 212. The XR device 110 may then implement one or more object tracking algorithms to continue to track the hand across multiple frames. To predict the movement of the hand more accurately, the XR device 110 processes the external tracking data from the IMU 114, which may be connected to the hand of the user 106. As mentioned, the IMU 114 may be attached to the hand of the user 106 and the pose of the IMU 114 can thus be tracked by the object tracking system 222 to provide an indication of the pose of the hand, e.g., of an anchor point associated with the hand. The external tracking data may have a lower processing latency than image data captured by the image sensors 212, thus allowing the XR device 110 to track the IMU 114 more rapidly and use the pose of the IMU 114 to generate hand pose forecasts.

In some examples, the XR device 110 uses the pose of the external IMU 114 to supplement or improve the image-based tracker's prediction. For example, and as described in more detail below, the XR device 110 may use the pose of the IMU 114 to generate a pose prediction for the anchor point on the hand associated with the IMU 114, and then use the predictions of the image-based tracker (which may, for example, provide more information about other parts of the hand, such as various joints) to construct pose data for the "full" hand.

The object tracking system 222 may also be configured to recognize specific hand gestures. For example, once a hand is detected and is being tracked, the object tracking system 222 may implement a further layer of processing to identify a predefined gesture. The object tracking system 222 may use a gesture recognition machine learning model that is, for example, trained on a data set of hand images that are labeled with the corresponding gestures. The gesture recognition machine learning model may analyze the pose of the hand, e.g., the palm, wrist, and fingers, to identify gestures. For instance, a fully open hand might correspond to a "stop" gesture, a closed first could be interpreted as a "grab" action, or a single pointed finger could represent a "select" command.

The AR application 226 may retrieve or generate virtual objects (e.g., a 3D object model). Virtual objects may be retrieved or generated based on an identified physical object 108 or physical environment (or other real-world feature), or based on other aspects of user context. The AR application 226 may also retrieve an augmentation to apply to real-world features, such as the physical object 108. The graphical processing unit 228 causes display of the virtual object, augmentation, or the like. The AR application 226 may include a local rendering engine that generates a visualization of a virtual object overlaid (e.g., superimposed upon, or otherwise displayed in tandem with) on an image of the physical object 108 (or other real-world feature) captured by the image sensor 212. A visualization of the virtual object may be manipulated by adjusting a position of the physical object or feature (e.g., its physical location, orientation, or both) relative to the image sensor 212. Similarly, the visualization of the virtual object may be manipulated by adjusting a pose of the XR device 110 relative to the physical object or feature.

The graphical processing unit 228 may include a render engine that is configured to render a frame of a model of a virtual object based on the virtual content provided by the AR application 226 and the pose of the XR device 110 (and, in some cases, the position of a tracked object, e.g., the predicted pose of a hand). In other words, the graphical processing unit 228 uses the three-dimensional pose of the XR device 110 and other data, as required, to generate frames of virtual content to be presented on a display 232. For example, the graphical processing unit 228 uses pose data to render a frame of the virtual content such that the virtual content is presented at an orientation and position in the display 232 to properly augment the user's reality. As an example, the graphical processing unit 228 may use the pose data indicative of the pose of the XR device 110 and the pose of the hand of the user to render a frame of virtual content such that, when presented on the display 232, the virtual content is caused to be presented to a user so as to overlap with the hand in the user's real-world environment 102. The graphical processing unit 228 can generate updated frames of virtual content based on updated poses of the XR device 110 and updated tracking data generated by the abovementioned tracking components, which reflect changes in the position and orientation of the user in relation to physical objects in the user's real-world environment 102, thereby resulting in a more immersive experience.

The graphical processing unit 228 may transfer a rendered frame to a display controller 230. The display controller 230 is positioned as an intermediary between the graphical processing unit 228 and the display 232, receives the image data (e.g., rendered frame) from the graphical processing unit 228, re-projects the frame (e.g., by performing a warping process) based on a latest pose of the XR device 110 (and, in some cases, object tracking pose forecasts or predictions), and provides the re-projected frame to the display 232. The display arrangement 208 may include one or more other optical components, such as mirrors, lenses, and so forth, depending on the implementation.

It will be appreciated that, in examples where an XR device includes multiple displays, each display may have a dedicated graphical processing unit and/or display controller. It will further be appreciated that where an XR device includes multiple displays, e.g., in the case of AR glasses or any other AR device that provides binocular vision to mimic the way humans naturally perceive the world, a left eye display arrangement and a right eye display arrangement may deliver separate images or video streams to each eye. Where an XR device includes multiple displays, steps or operations may be carried out separately and substantially in parallel for each display, in some examples, and pairs of features or components may be included to cater for both eyes.

For example, an XR device may capture separate images for a left eye display and a right eye display (or for a set of right eye displays and a set of left eye displays), and render separate outputs for each eye to create a more immersive experience and to adjust the focus and convergence of the overall view of a user for a more natural, three-dimensional view. Thus, while a single set of display arrangement components, or a single set of output images, may be discussed to describe some examples, similar techniques may be applied to cover both eyes by providing a further set of display arrangement components.

The storage component 210 may store various data, such as the on-board sensor data 234 and/or external tracking data 236 referred to above. The on-board sensor data 234 may include captured images or processed image data, e.g., image data to which computer vision algorithms have been applied to generate detections or predictions. The on-board sensor data 234 may also include, for example, measurement data of the inertial sensor 214, such as accelerometer measurements, gyroscope measurements, magnetometer measurements, and/or temperature measurements, or depth information from the depth sensor 216.

The external tracking data 236 may, as indicated above, include "raw" measurements from the IMU 114 or processed tracking data. The external tracking data 236 is referred to as "external" as the data originates from a component or device external to the XR device 110.

The storage component 210 may further store pose data 238, e.g., historic poses of the XR device 110 or a tracked object, or pose forecasts generated by the XR device 110. The object tracking settings 240 may further store object tracking settings 240. The object tracking settings 240 may include settings or rules to be followed by the processor 204 in performing object tracking or generating pose forecasts. For example, the object tracking settings 240 may include triggers indicating when to activate the tracking mode of the external IMU 114 or algorithms for using both external tracking data and on-board sensor data (e.g., image data or image-based tracker outputs) to generate pose forecasts.

Any one or more of the components described herein may be implemented using hardware (e.g., a processor of a machine) or a combination of hardware and software. For example, any component described herein may configure a processor to perform the operations described herein for that component. Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices. A component may be implemented locally at the XR device, or server-side, or both at the XR device and server-side, depending on the component and design.

Figure 3:
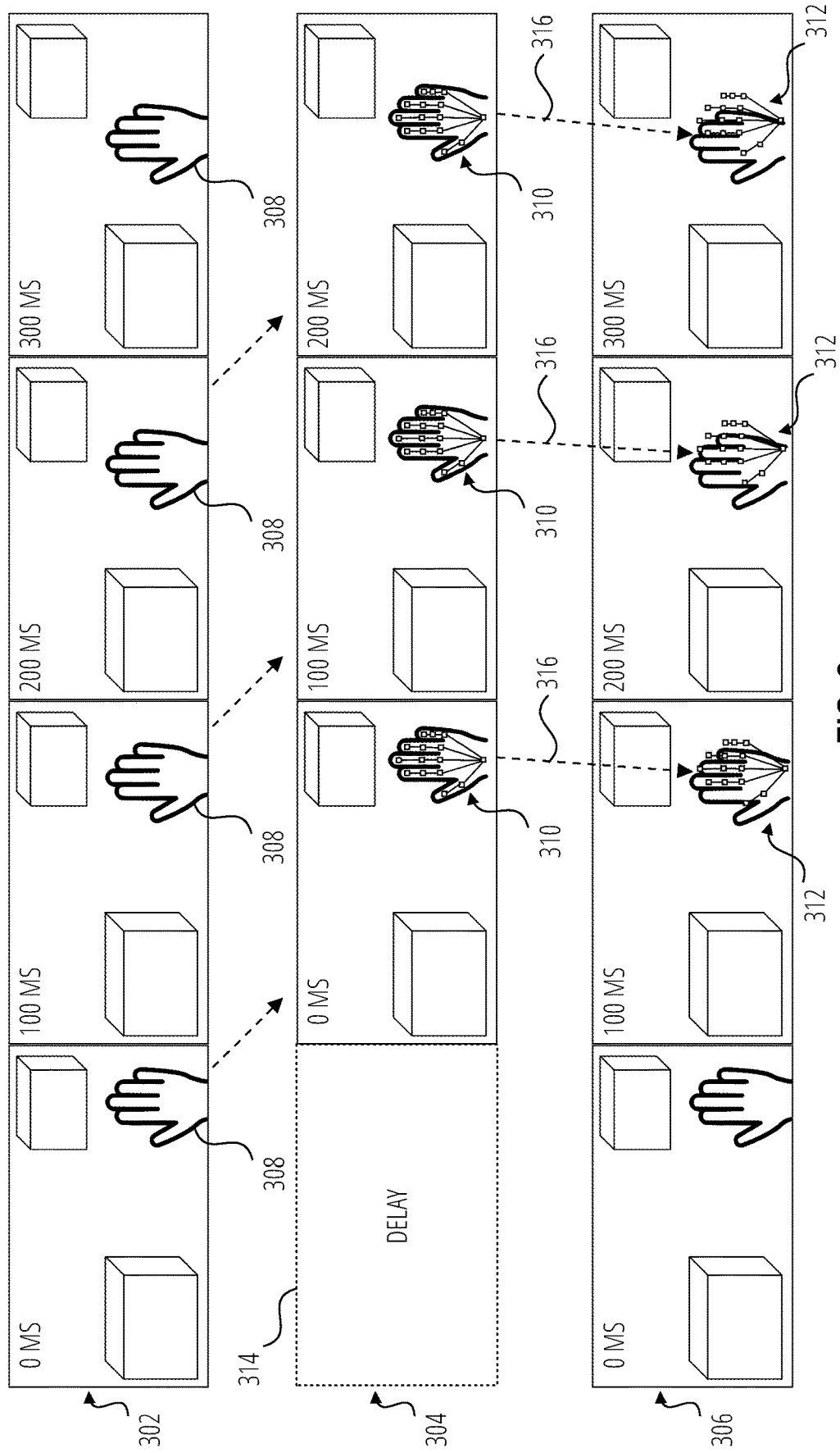
FIG. 3 is a diagram illustrating, at different points in time, a real-world environment as seen by a user of an XR device, the processing of images of the real-world environment captured by the XR device, and the rendering of virtual content on a display of the XR device by applying pose forecasts.

FIG. 3 is a diagram illustrating a reality sequence 302, an image processing and rendering sequence 304, and an AR sequence 306, at various points in time (0 ms, 100 ms, 200 ms, and 300 ms), according to some examples. Operations described with reference to FIG. 3 may be performed by an XR device using at least some components (e.g., parts, modules, systems, or engines) described above with respect to FIGS. 1 and 2. Accordingly, by way of example and not limitation, reference is made to the XR device 110 and certain components thereof. However, it shall be appreciated that at least some of the operations described with reference to FIG. 3 may be deployed on various other hardware configurations or be performed by similar components residing elsewhere.

In FIG. 3, the user 106 wears the XR device 110 as a head-mounted device. However, in FIG. 3, the user 106 does not wear an external sensor (e.g., IMU 114) and the XR device 110 thus does not receive external tracking data from an external sensor.

The XR device 110 provides the user 106 with an AR experience by rendering virtual content to appear overlaid on the hand 308 of the user 106. In FIG. 3, and merely as an example, the virtual content is an augmentation configured to overlay a "skeleton" onto the hand 308, with the "fingers" of the "skeleton" intended to be aligned with the real fingers on the hand 308 of the user 106.

The reality sequence 302 shows a real-world scene as seen by the user 106. In other words, the reality sequence 302 shows the view of the user 106 without any virtual content overlaid or superimposed thereon. The user 106 moves their hand 308 from right to left. As shown at a first point in time (0 ms) in the reality sequence 302, the hand 308 starts at a particular position relative to objects in the real-world scene and moves progressively to the left as time progresses to 100 ms, then to 200 ms, and then to 300 ms.

The XR device 110 captures images of the real world scene of the reality sequence 302 at each point in time (0 ms, 100 ms, 200 ms, and 300 ms) and processes the images. It will be appreciated that the XR device 110 may capture frames at a higher rate than the rate at which frames are sampled from a processing perspective, e.g., through sub-sampling. The image processing and rendering sequence 304 illustrates aspects of image processing and visual content rendering. The XR device 110 processes each image and renders virtual content for presentation to the user 106. As shown in the image processing and rendering sequence 304, the XR device 110 processes the image captured at time t=0 ms to identify positions of landmarks on the hand 308 (e.g., joints) and uses the positions of landmarks to generate the "skeleton" augmentation 310. For illustrative purposes, the landmarks are shown as spaced apart blocks on the hand 308 in the image processing and rendering sequence 304. The XR device 110 may thus construct the pose of the hand 308 based on landmark positions and/or certain angles.

It is noted that FIG. 3 is a simplified, two-dimensional example, and that the XR device 110 may determine the 3D or 6DOF pose of the hand 308 in order to render the augmentation 310.

The XR device 110 follows a similar process for the images captured at time t=100 ms, time t=200 ms, and so forth.

As described above, there is a delay between the time when an image (e.g., a particular video frame) is taken and the time when a result is available for presentation, e.g., the time when virtual content is shown on a display of the XR device. The block 314 in the image processing and rendering sequence 304 illustrates the delay. In other words, while the first image of FIG. 3 may be captured at time t=0 ms, its processed data is not yet available at that point in time.

In the case of FIG. 3, image processing and rendering takes 100 ms and there is thus a so-called "AR lag" of 100 ms. For example, in the intervening 100 ms since the first image was captured (at time t=0 ms), the hand 308 moved relative to the XR device 110, thus changing its position relative to the initial position. This is evident from a comparison between the images at time t=0 ms and time t=100 ms in the reality sequence 302.

As a result, it is undesirable in such a dynamic scenario for the XR device 110 to render and place the augmentation 310 solely based on the pose of the hand 308 in the first image, as this would likely result in the augmentation 310 not being properly aligned with the hand 308. Instead, a pose forecast is generated so that the augmentation 310 can be adjusted to take, for example, the predicted movement of the hand 308 between time t=0 ms and time t=100 ms into account.

The XR device 110 thus predicts, using an image-based tracker, where the hand 308 will be at time t=100 ms. The XR device 110 determines, e.g., based on prior frames (not shown), that the hand 308 is moving from right to left and forecasts the pose of the hand 308. A pose-adjusted augmentation 312 is rendered and presented to the user 106 as shown in the AR sequence 306. The adjustment of the pose is conceptually illustrated by the arrows 316 in FIG. 3.

The XR device 110 continues the above-described tracking, processing, and rendering operations for subsequent frames to render the pose-adjusted augmentation 312 at time t=200 ms, time t=300 ms, and so forth. The pose-adjusted augmentations 312 are thus rendered and presented to the user 106 at a 100 ms delay per frame, with pose forecasts being used to compensate for the delay as part of predictive tracking, e.g., to render each pose-adjusted augmentation 312 so that it appears as close as possible to the correct location when the next frame is displayed.

Predictive tracking may involve both state estimation and prediction. For example, the XR device 110 may use the object tracking system 222 to estimate a current position, orientation, and/or velocity of the hand 308 using sensor data from the sensors 202. For instance, an object tracking algorithm such as Kalman filter or particle filter may be used to estimate these parameters based on the on-board sensor data 234. The XR device 110 may further use the pose forecasting system 224 together with the object tracking system 222 to predict a future state of the hand 308. The object tracking system 222 may use a model of the dynamics of the hand 308 together with tracking algorithms and/or machine learning models to predict the future state, e.g., future pose.

However, pose forecasting based solely on the results of an image-based tracker and limited to on-board sensor data, e.g., using the on-board sensor data 234 only, may be technically challenging and result in the pose-adjusted augmentation 312 not being sufficiently aligned with the hand 308, as shown in the AR sequence 306. For example, the delay of 100 ms may be seen as a relatively long period in a hand tracking context, particularly when there is significant or unpredictable movement, and assumptions such as constant-velocity can result in substantial errors in display-time predictions. Errors may compound over time, with the pose-adjusted augmentation 312 becoming progressively less aligned with the hand 308, as also illustrated in the AR sequence 306 in FIG. 3. This latency due to the moving hand 308 of the user 106 may negatively affect user experience. Further, the issue may result in technical problems, e.g., making the XR device 110 difficult to operate correctly where an XR experience relies on quick or real-time interactions.

Examples described herein address or alleviate these and/or other technical challenges by utilizing external tracking data. Examples are described with reference to FIGS. 4 to 7 below.

Figure 4:
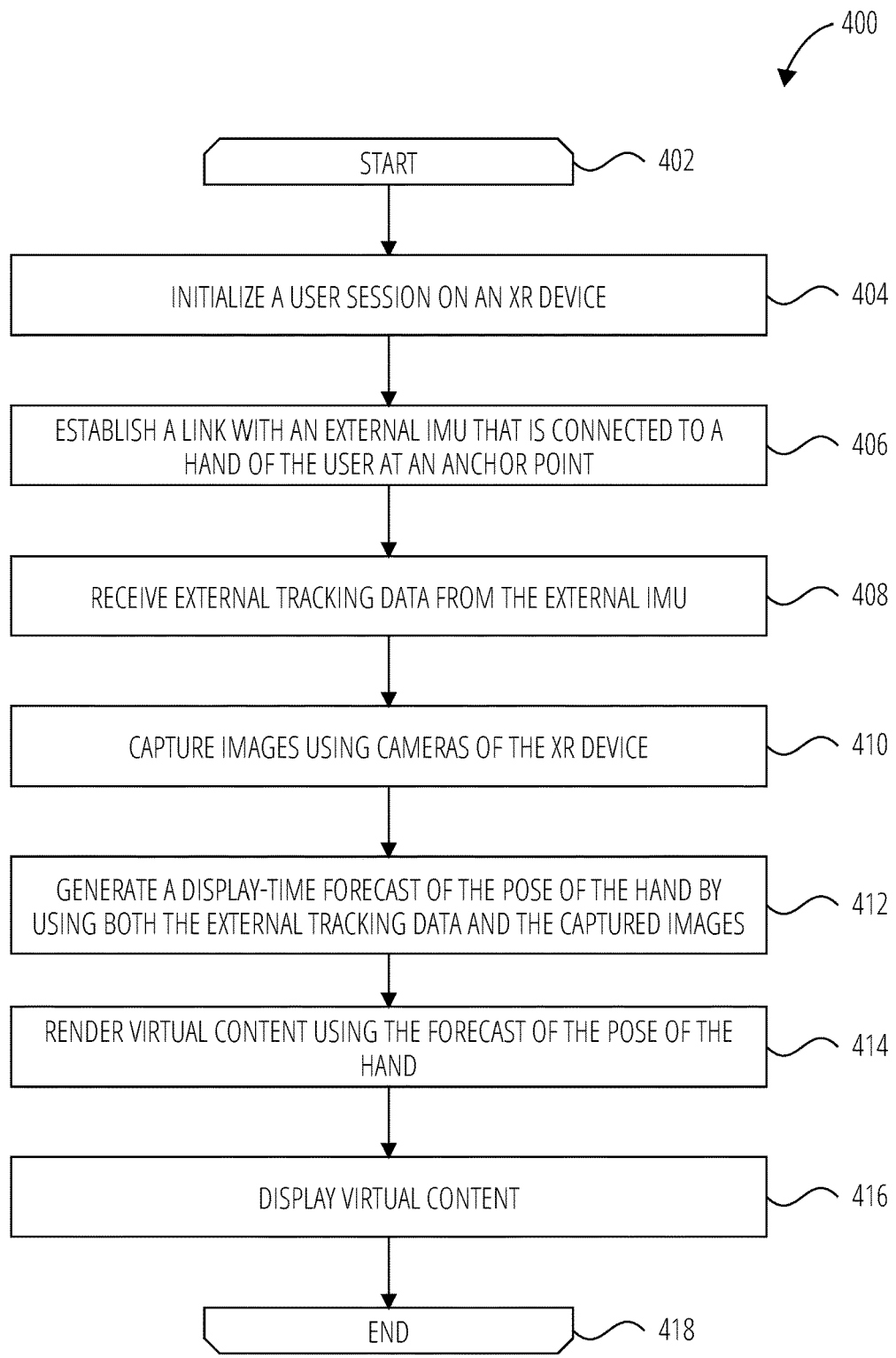
FIG. 4 is a flowchart illustrating a method suitable for using image data and external tracking data to generate a pose forecast and render, by an XR device, virtual content based on the pose forecast, according to some examples.

FIG. 4 is a flowchart illustrating a method 400 suitable for using image data and external tracking data to generate a pose forecast and render, by an XR device, virtual content based on the pose forecast, according to some examples. Operations in the method 400 may be performed by an XR device using components (e.g., parts, modules, systems, or engines) described above with respect to FIGS. 1 and 2. Accordingly, by way of example and not limitation, the method 400 is described with reference to the XR device 110 and certain components thereof. However, it shall be appreciated that at least some of the operations of the method 400 may be deployed on various other hardware configurations or be performed by similar components residing elsewhere.

The method 400 commences at opening loop element 402 and proceeds to operation 404, where the XR device 110 starts a user session. The XR device 110 may enable the user 106 to have an XR experience during the user session, e.g., through interaction with a 3D user interface, presentation of virtual content, and/or one or more features of the AR application 226, such as an AR game. In the method 400, the XR device 110 is a head-mounted device that allows the user to see the real-world environment 102 with virtual content overlaid onto the real-world environment 102.

The XR device 110 observes the hand of the user 106 during the user session using sensors, as described further below. It is noted that while the operations described herein focus on the tracking of one hand of the user 106, similar techniques may be applied to track both hands of the user 106. Similar techniques may also be applied to track other body parts.

At operation 406, the XR device 110 establishes the communication link 116 with the IMU 114. In the method 400, the IMU 114 is connected or attached to a hand of the user 106, and the IMU 114 is wirelessly coupled to the XR device 110 worn by the user 106. In some cases, the user 106 may wear multiple IMUs 114, e.g., one on a specified finger of each hand, or one on each wrist. In other cases, the IMU 114 may be held as a handheld device, e.g., similar to a controller.

The XR device 110 continuously receives external tracking data from the IMU 114, as described above (operation 408). The external tracking data enables the XR device 110, e.g., the object tracking system 222, to track the position, orientation, and/or movements of the IMU 114. For example, the user 106 may wear the IMU 114 as a ring on a specific finger, e.g., the thumb of the right hand (see FIG. 5 as a non-limiting example). This allows the XR device 110 to track or estimate the pose of the thumb by tracking the pose of the IMU 114. As mentioned, the position or point at which the IMU 114 is connected to the body part of the user 106 (e.g., extremity, such as a finger or arm) is referred to herein as the anchor point. An anchor point pose forecast may thus be used as, or translated to, a pose forecast for the body part itself.

In examples where multiple external sensors are employed, the XR device 110 may be enabled to track multiple different anchor points to further improve pose forecasting.

Referring again to FIG. 4, the XR device 110 also captures images of the hand using one or more cameras, e.g., part of the image sensors 212, at operation 410. The XR device 110 may capture a video of the real-world environment 102 comprising a series of frames, thus capturing movement of the hand of the user 106 relative to the XR device 110 or within the real-world environment 102.

At operation 412 of the method 400, the XR device 110 uses both the external tracking data from the IMU 114 and the captured images (and optionally other on-board sensor data from the sensors 202, such as depth measurements) to generate a display-time forecast of the pose of the hand of the user 106. The XR device 110 may sample frames from a larger set of captured frames for processing.

In some examples, the external tracking data from the IMU 114 is used to forecast, with respect to a future point in time, the pose of the anchor point, e.g., a finger joint or wrist. An image-based tracker (e.g., an image-based hand tracking model) provides a forecast for the same future point in time, but tracks more details, e.g., the positions of multiple finger joint landmarks not observed directly by the IMU 114. The image-based tracker results may be used to supplement the anchor point forecast and thus create a pose forecast for the hand.

In some examples, data from the IMU 114 and the camera/s are fused to generate the anchor point forecast, with the data from the camera/s being used to create the pose forecast for the rest of the hand.

The image-based tracker of the object tracking system 222 may use a hand pose estimation model to identify the positions and orientations of the hand's joints (or a subset thereof). The output of the image-based tracker may include 3D coordinates of each joint in the hand, together defining the position and orientation (pose) of the hand. The output may also include angles, e.g., estimated angle of the thumb or index finger. Given a sequence of past hand poses, for example, a hand pose forecasting model of the image-based tracker may predict future hand poses, e.g., using Recurrent Neural Network techniques.

The external tracking-based data and image-based data (or on-board sensor-based data) may be integrated, combined, or adjusted in various ways. In some examples, the anchor point forecast is integrated into the image-based tracker results, causing the forecasts generated by the image-based tracker to be adjusted or shifted to align with the anchor point forecast. In other words, the anchor point forecast may be used as a "known" value, with values for other landmarks (e.g., finger joints) being automatically adjusted such that all values align in a model of the hand.

In some examples, the XR device 110 may compare the anchor point forecast generated from the external tracking data (e.g., IMU data from multiple prior time points) with a corresponding forecast for the same point, or a comparable point, as generated using the image-based tracker, and combine the results to generate a final pose forecast.

As mentioned, in some examples, the IMU 114 has a higher sampling rate and/or a lower processing latency than the cameras of the XR device 110. In other words, the XR device 110 receives more frequent updates from the IMU 114 as to the pose of the anchor point than it receives updated and processed image data originating from the on-board cameras. For example, an updated pose of the IMU 114 may become available every 5 ms, 10 ms, or 15 ms, while the processing of an image may take longer, e.g., 50 ms, 100 ms, or 150 ms. Therefore, using the external tracking data allows for both accurate forecasting of the future pose of the IMU 114 and the use of that forecast, together with the traditional image-based tracking output, to improve the pose forecast for the full hand.

It is noted that various processing and preprocessing operations may be performed on the external tracking data and/or the image data. For example, the external tracking data may comprise "raw" sensor readings and the data may be processed to generate or estimate the pose of the IMU 114. The image data may be preprocessed to enhance the relevant features for hand pose estimation, e.g., by normalization, scaling, or filtering. A hand detection model may be used to identify the location of the hand in the visual data. This may be produced as a bounding box around the hand. A segmentation step may be used to isolate the hand from the rest of the visual data.

In some cases, inertial data, such as IMU-based tracking outputs, can drift over time, e.g., through accumulation of errors. The image data may be used to adjust the external tracking data to compensate for IMU drift. In some examples, the XR device 110 is configured to compare positions in images captured by its cameras to the measurements of the IMU 114 at corresponding times. If there is a significant difference, the XR device 110 may assume that the IMU data has drifted and adjust or compensate as required.

Known techniques may be used to compensate for IMU drift by using tracking data from a camera (or from multiple cameras). For example, a Kalman filter can be used to fuse the "drift-free," but low-frequency, camera-based tracking data with the "drifting," but high-frequency, IMU-based tracking data. In this context, the term "drift-free" means that the camera does not accumulate errors over time in a way that an IMU may accumulate errors.

The XR device 110 renders virtual content using the forecast of the pose of the hand at operation 414, and displays the virtual content to the user 106, e.g., on the display 232 (operation 416). It will be appreciated that operations described with reference to FIG. 4 may be continuously repeated, e.g., to generate updated virtual content for new frames to match updated poses of the hand. The method 400 ends at closing loop element 418.

Figure 5:
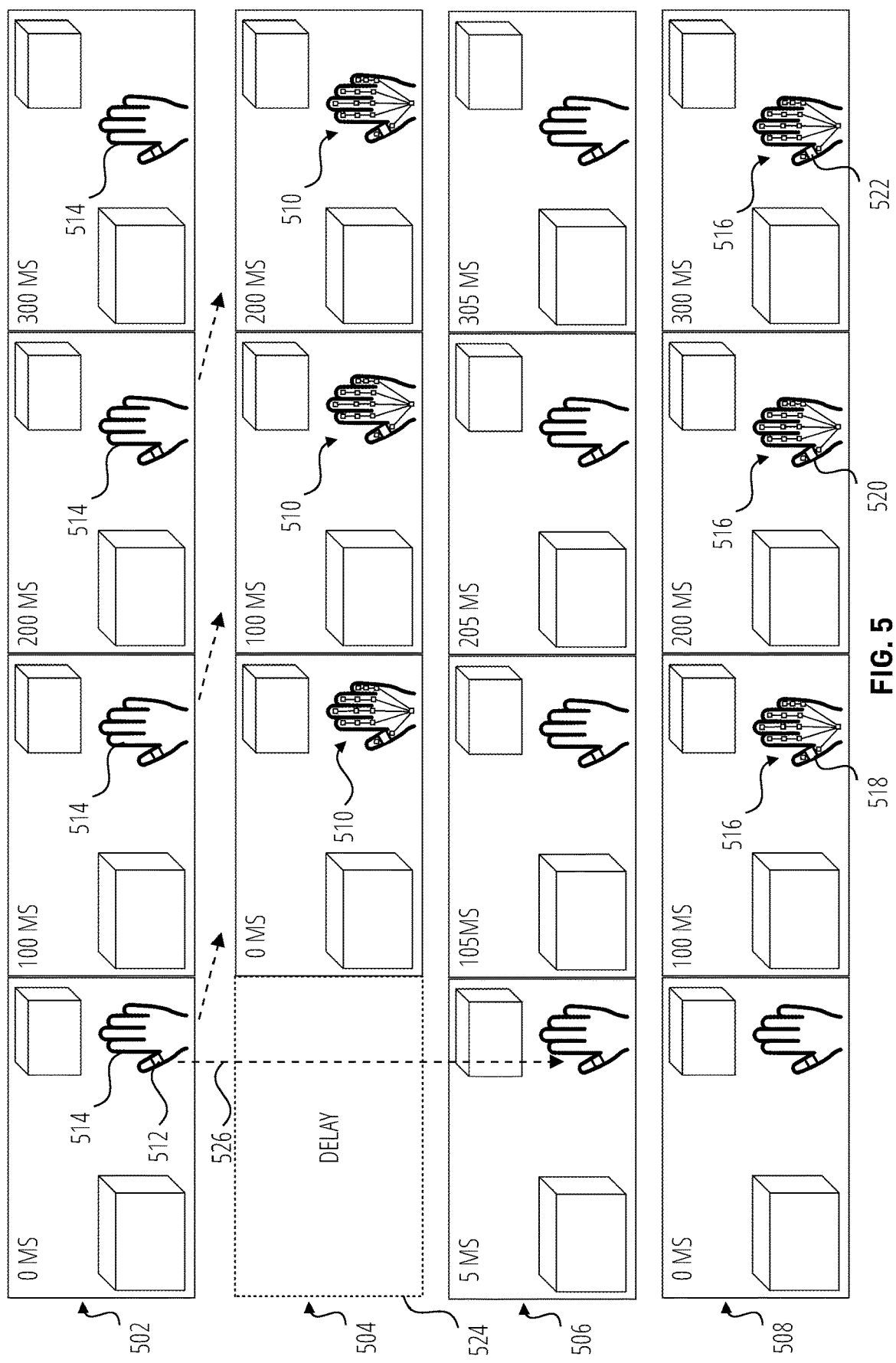
FIG. 5 is a diagram illustrating, at different points in time, a real-world environment as seen by a user of an XR device, the processing of images of the real-world environment captured by the XR device, the processing of external tracking data received by the XR device, and the rendering of virtual content on a display of the XR device by applying pose forecasts.

FIG. 5 is a diagram illustrating a reality sequence 502, an image processing and rendering sequence 504, an IMU tracking sequence 506, and an AR sequence 508, at various points in time, according to some examples. Operations described with reference to FIG. 5 may be performed by an XR device using at least some components (e.g., parts, modules, systems, or engines) described above with respect to FIGS. 1 and 2. Accordingly, by way of example and not limitation, reference is made to the XR device 110 and certain components thereof. However, it shall be appreciated that at least some of the operations described with reference to FIG. 5 may be deployed on various other hardware configurations or be performed by similar components residing elsewhere.

In FIG. 5, the user 106 wears the XR device 110 as a head-mounted device. Further, and contrary to the arrangement described with reference to FIG. 3, the user 106 wears an external sensor in the form of an IMU ring 512 on the thumb of their hand 514. The IMU ring 512 may have components and/or functionality similar to the IMU 114 of FIG. 1. The IMU ring 512 collects high-frequency data enabling tracking of the position, orientation, and/or movement of the IMU ring 512 and thus the relevant part of the thumb of the user 106.

In this example, the IMU ring 512 is referred to as "high frequency" as it has a higher sampling rate than the sampling rate associated with image data captured by one or more cameras of the XR device 110. For example, while the XR device 110 is only able to sample a video frame each 100 ms due to processing latency, the external tracking data is processed more rapidly, e.g., at a 5 ms processing latency, thus allowing for more frequent sampling. As a result, the pose forecasting time required for the IMU ring 512 is less than the pose forecasting time required for images captured and processed by the XR device 110.

The IMU ring 512 may be associated with a specific landmark that is used by the XR device 110 in hand tracking, e.g., a thumb joint or a landmark that is defined at a particular distance from a specific thumb joint. In this way, the IMU ring 512 can define an anchor point from which other pose data (e.g., landmarks) can be compared, calculated, adjusted, or reconstructed. As a result, the XR device 110 is able to perform combined visual and external IMU-based forecasting, as described below.

In FIG. 5, the XR device 110 provides the user 106 with an AR experience by rendering virtual content to appear overlaid on the hand 514 of the user 106. As with FIG. 3, and merely as an example, the virtual content is an augmentation configured to overlay a "skeleton" onto the hand 514, with the "fingers" of the "skeleton" intended to be aligned with the real fingers on the hand 514 of the user 106. It will be appreciated that various types of augmentations or other virtual content may be applied using techniques described herein.

The reality sequence 502 shows a real-world scene as observed by the user 106. In other words, the reality sequence 502 shows the view of the user 106 without any virtual content overlaid or superimposed thereon. The user 106 moves their hand 514 from right to left, resulting in the IMU ring 512 moving with the hand 514.

The XR device 110 captures images of the real world scene of the reality sequence 502 at sequential points in time (0 ms, 100 ms, 200 ms, and 300 ms) and processes the images. It will be appreciated that the XR device 110 may capture frames at a higher rate than the rate at which frames are sampled from a processing perspective, e.g., through subsampling. The image processing and rendering sequence 504 illustrates aspects of image processing and visual content rendering. The XR device 110 processes each image and renders virtual content for presentation to the user 106. As shown in the image processing and rendering sequence 504, the XR device 110 processes the image captured at time t=0 ms to identify positions of landmarks on the hand 514 and uses the positions of landmarks to generate the "skeleton" augmentation 510. The XR device 110 may thus construct the pose of the hand 514 based on landmark positions and/or certain angles.

Again, it is noted that FIG. 5 is a simplified, two-dimensional example and that the XR device 110 may determine the 3D or 6DOF pose of the hand 514 in order to render the augmentation 510.

The XR device 110 follows a similar process for the images captured at time t=100 ms, time t=200 ms, and so forth.

In FIG. 5, to address the delay between the time when an image (e.g., a particular video frame) is taken and the time when a result is available for presentation, as depicted by the block 524 in the image processing and rendering sequence 504, the XR device 110 uses both image data and external tracking data originating from the IMU ring 512 to generate pose forecasts for the hand 514.

In the case of FIG. 5, image processing and rendering takes 100 ms and there is thus a so-called "AR lag" of 100 ms. For example, in the intervening 100 ms since the first image was captured (at time t=0 ms), the hand 514 moved relative to the XR device 110, thus changing its position relative to the initial position. This is evident from a comparison between the images at time t=0 ms and time t=100 ms in the reality sequence 502. Again, FIG. 5 is a simplified illustration, and it is noted that not only the position, but also the orientation, of the hand 514 may change over time relative to the XR device 110.

Referring now to the IMU tracking sequence 506, while there is a delay of 100 ms for image processing and content rendering to be completed, the IMU 114 has a lower latency and it takes only 5 ms (as an example) to process the IMU data. Thus, the XR device 110 is able to update the estimated pose of the IMU 114 more rapidly. For example, the arrow 526 in FIG. 5 conceptually illustrates that the measurements taken by the IMU ring 512 at time t=0 ms can be processed to obtain an IMU pose for time t=0 ms at time t=5 ms. Although not shown in FIG. 5, the IMU pose may be updated multiple times before time t=100 ms.

This may allow for an accurate pose forecast for the anchor point defined by the IMU 114 on the thumb of the hand 514. In some examples, the IMU 114 allows the XR device 110 to obtain an accurate anchor point or reference position, e.g., in six dimensions.

For instance, for purposes of rendering content for display at time t=100 ms, while the XR device 110 may be unable to finalize processing of any new images after capturing the first image at time t=0 ms, the XR device 110 can obtain and apply multiple data points from the external IMU 114 in the intervening period, thereby improving the accuracy of the pose forecast as the XR device 110 can receive more data relating to any changes in the pose of the hand 514 during this period.

The XR device 110 thus predicts, using data from an image-based tracker of the object tracking system 222 together with external tracking data from the IMU 114, where the hand 308 will be at time t=100 ms. For example, as described with reference to FIG. 4, the IMU data may be used to forecast a pose of an anchor point 518 at time t=100 ms (or to improve the forecast that would have been obtained using image data alone), as shown in the AR sequence 508, with the other landmarks being forecast, reconstructed, or updated based on the anchor point 518 to improve the overall accuracy of the forecasted pose of the hand 514.

In some examples, an IMU-based predicted anchor point for time t=100 ms (which may be a 6DOF anchor pose) can be fused with the image-based prediction of the anchor pose for time t=100 ms (which may also be a 6DOF anchor pose) to obtain the forecast of the pose of the anchor point 518. A suitable technique, such as a Kalman filter technique, may be used in the fusion and prediction process. In some examples, the fused data is used to predict the anchor point 518, with the rest of the hand then being predicted, based on the anchor point 518, using image-based predictions.

A pose-adjusted augmentation 516 is rendered and presented to the user 106 as shown in the AR sequence 508. The AR sequence 508 shows the reality perceived by the user 106 together with the superimposed virtual content presented via the display 232 of the XR device 110. It will be evident that, when compared to FIG. 3, the pose-adjusted augmentation 516 of FIG. 5 is better aligned with the hand 514 than the pose-adjusted augmentation 312 rendered with respect to the hand 308 of FIG. 3.

The XR device 110 continues the above-described tracking, processing, and rendering operations for subsequent frames to obtain anchor points 520, 522, and so forth, and to render the pose-adjusted augmentation 516 in suitable positions and/or at suitable orientations.

Figure 6:
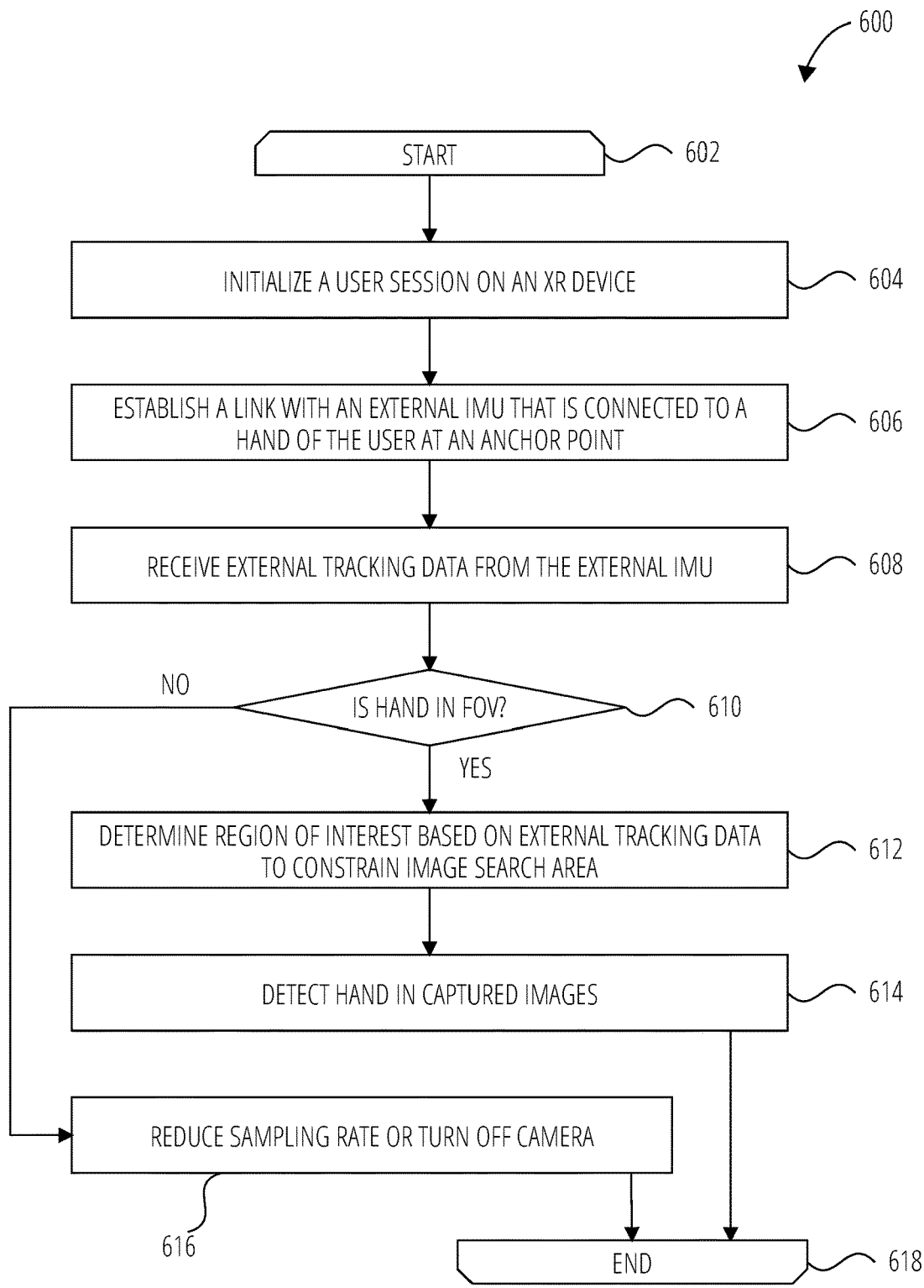
FIG. 6 is a flowchart illustrating a method suitable for using external tracking data to determine whether a hand of a user of an XR device is in a field of view of the XR device, according to some examples.

FIG. 6 is a flowchart illustrating a method 600 suitable for using external tracking data to determine whether a hand of a user of an XR device is in a field of view of the XR device, according to some examples. Operations in the method 600 may be performed by an XR device using components (e.g., parts, modules, systems, or engines) described above with respect to FIGS. 1 and 2. Accordingly, by way of example and not limitation, the method 600 is described with reference to the XR device 110 and certain components thereof. However, it shall be appreciated that at least some of the operations of the method 600 may be deployed on various other hardware configurations or be performed by similar components residing elsewhere.

The method 600 commences at opening loop element 602 and proceeds to operation 604, where the XR device 110 starts a user session. The XR device 110 may enable the user 106 to have an XR experience during the user session, e.g., through interaction with a 3D user interface, presentation of virtual content, and/or one or more features of the AR application 226, such as an AR game. In the method 600, the XR device 110 is a head-mounted device that allows the user to see the real-world environment 102 with virtual content overlaid onto the real-world environment 102. The XR device 110 includes a color camera as part of its image sensors 212. The color camera captures a video stream of the real-world environment 102.

At operation 606, the XR device 110 establishes the communication link 116 with the IMU 114. In the method 600, the IMU 114 is connected or attached to a hand of the user 106, and the IMU 114 is wirelessly coupled to the XR device 110 worn by the user 106.

The XR device 110 continuously receives external tracking data from the IMU 114 (operation 608). The external tracking data enables the XR device 110, e.g., the object tracking system 222, to track the position, orientation, and/or movements of the IMU 114, as described above.

In some examples, the XR device 110 may check at decision operation 610 whether the hand on which the IMU 114 is worn is in the field of view of the XR device 110. For example, based on the tracked position of the IMU 114, the XR device 110 can determine whether an image captured by the color camera of the image sensor 212 would include or exclude the hand. This information may be technically beneficial as it may allow the XR device 110 to reduce its computing load, as described below.

If the XR device 110 determines, at decision operation 610, that the hand is in the field of view of the color camera, the XR device 110 can identify a region of interest to constrain an image search area (operation 612). For example, based on the external tracking data, the XR device 110 may determine that the hand is in a top-right region of the camera field of view, or predict that the hand will be in the top-right region of the camera field of view in a target frame (at a point in the future). When the XR device 110 subsequently performs image processing with respect to one or more captured images, the object tracking system 222 may only process the parts of the images covering the region of interest in order to detect (operation 614) or track the hand, thus reducing an overall processing load.

The XR device 110 may thus track the extremity of the user 106 (e.g., the hand) by only analyzing the region of interest. In this way, the XR device 110 can advantageously exploit the IMU data from the external IMU 114 to constrain its image search or image processing areas. The region of interest may be dynamically updated as the pose of the IMU 114 changes over time.

On the other hand, if the XR device 110 determines, at decision operation 610, that the hand is not in the field of view of the color camera, or will not be in the field of view in a target frame, the XR device 110 may enter a reduced processing or power-saving mode at operation 616. For example, and as shown in FIG. 6, the XR device 110 may either reduce the sampling rate associated with the color camera or may turn off the relevant camera. For example, where the XR device 110 is in an idle mode and awaiting a hand gesture from the user 106 to generate content, the XR device 110 may save power or processing resources in this manner while the relevant hand is not in the field of view. The method 600 concludes at closing loop element 618.

Figure 7:
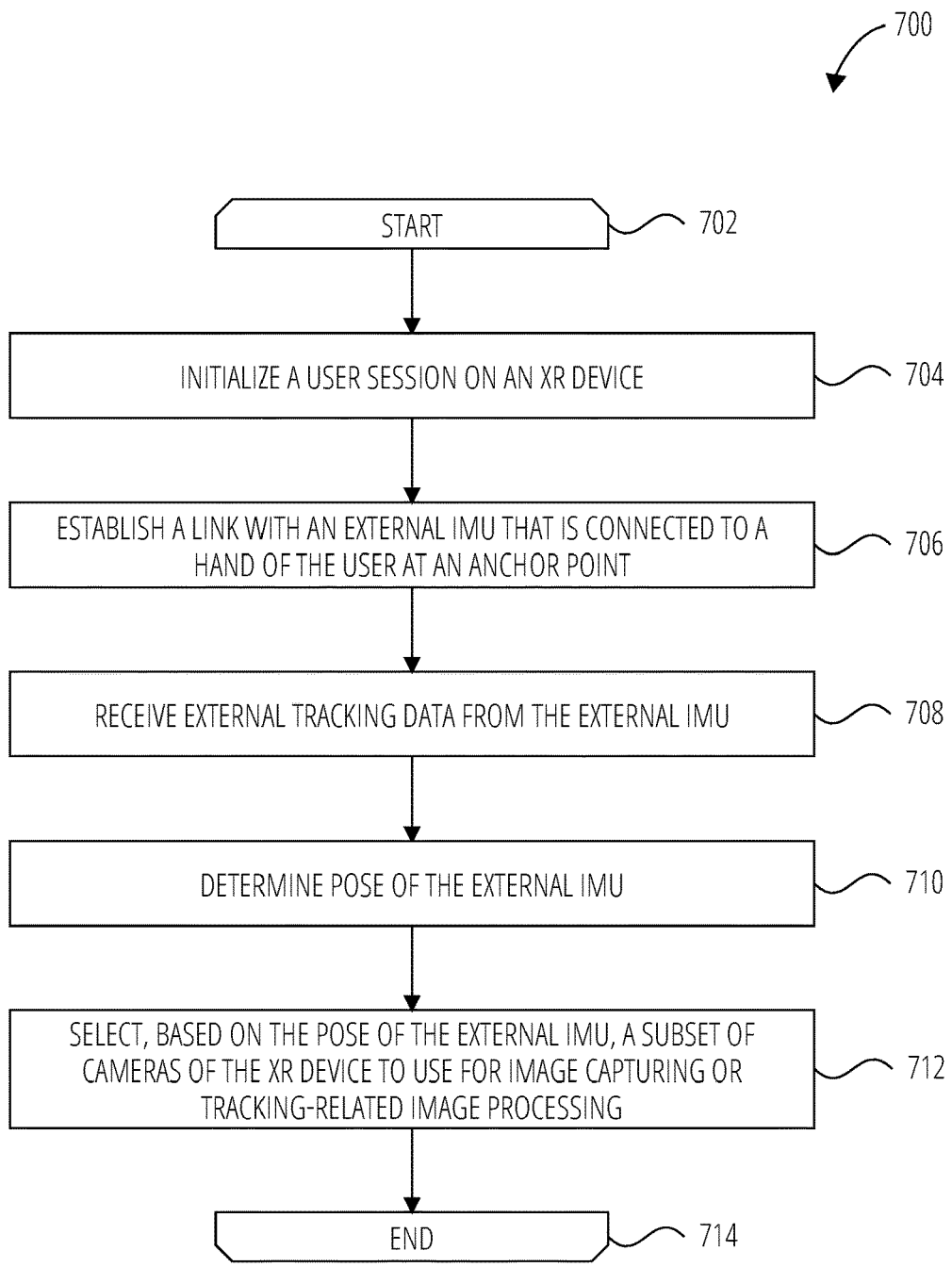
FIG. 7 is a flowchart illustrating a method suitable for using external tracking data to select a subset of cameras of an XR device for performing hand tracking, according to some examples.

FIG. 7 is a flowchart illustrating a method 700 suitable for using external tracking data to select a subset of cameras of an XR device for performing hand tracking, according to some examples. Operations in the method 700 may be performed by an XR device using components (e.g., parts, modules, systems, or engines) described above with respect to FIGS. 1 and 2. Accordingly, by way of example and not limitation, the method 700 is described with reference to the XR device 110 and certain components thereof. However, it shall be appreciated that at least some of the operations of the method 700 may be deployed on various other hardware configurations or be performed by similar components residing elsewhere.

The method 700 commences at opening loop element 702 and proceeds to operation 704, where the XR device 110 starts a user session. The XR device 110 may enable the user 106 to have an XR experience during the user session, e.g., through interaction with a 3D user interface, presentation of virtual content, and/or one or more features of the AR application 226, such as an AR game. In the method 700, the XR device 110 is a head-mounted device that allows the user to see the real-world environment 102 with virtual content overlaid onto the real-world environment 102.

Further, in the method 700, the XR device 110 includes multiple color cameras as part of its image sensors 212. For example, the XR device 110 may be AR glasses with a frame that has a top-right camera, a top-left camera, a bottom-left camera, and a bottom-right camera mounted thereto. These cameras capture the real-world environment 102 from different angles and with different, but overlapping, fields of view. The use of multiple cameras may improve tracking, e.g., by improving depth estimations and widening an overall detection and tracking field, but may increase processing requirements and power usage.

At operation 706, the XR device 110 establishes the communication link 116 with the IMU 114. In the method 700, the IMU 114 is connected or attached to a hand of the user 106, and the IMU 114 is wirelessly coupled to the XR device 110 worn by the user 106.

The XR device 110 continuously receives external tracking data from the IMU 114 (operation 708). The external tracking data enables the XR device 110, e.g., the object tracking system 222, to track the position, orientation, and/or movements of the IMU 114, as described above.

At operation 710, the XR device 110 determines the pose of the IMU 114. For example, the XR device 110 may use the external tracking data and the object tracking system 222 to determine the location of the IMU 114 relative to the XR device 110 in a previous frame. The XR device 110 may also, or alternatively, predict the location of the IMU 114 in a future (target) frame.

The XR device 110 then uses this information of the IMU 114, e.g., its relative location from the XR device 110, to select a subset of the cameras of the XR device 110 to use for image capturing or tracking-related image processing, at operation 712. For example, referring to the four cameras mentioned above, the XR device 110 may determine that the IMU 114, and thus the hand of the user 106 to which the IMU 114 is connected, is located in a left region of the overall field of view. In other words, the hand may be more centrally located in the fields of view of the top-left camera and the bottom-left camera than in the fields of view of the top-right camera and the bottom-right camera. In response, the XR device 110 selects only the top-left camera and the bottom-left camera. The "selection" of one or more cameras in this context may refer to using only images from those cameras for tracking-related processing while the other cameras continue to capture images, or turning off the other cameras (e.g., deactivating them or switching them to an idle state). In this way, power usage can be reduced within a multi-camera XR device.

The XR device 110 may dynamically switch between different subsets of cameras as the pose of the IMU 114 changes. For example, if the user 106 moves the hand to the right, the XR device 110 may dynamically switch to the top-right camera and the bottom-right camera, excluding the top-left camera and bottom-left camera from selection, sampling, or processing. The image data used for hand tracking is therefore associated only with the subset of cameras that are selected at a given point in time. The method 700 concludes at closing loop element 714.

Figure 8:
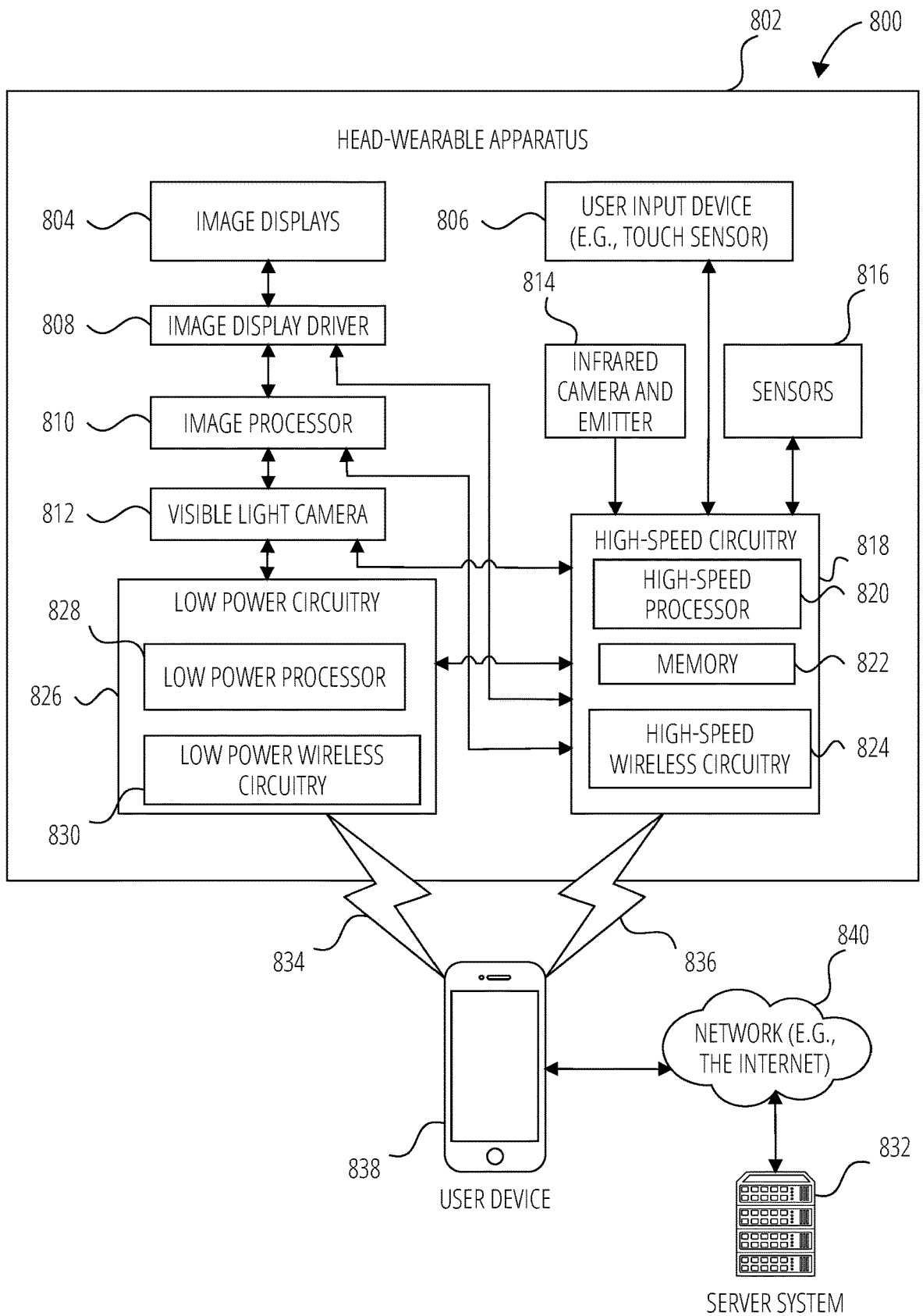
FIG. 8 illustrates a network environment in which a head-wearable apparatus can be implemented, according to some examples.

FIG. 8 illustrates a network environment 800 in which a head-wearable apparatus 802, e.g., a head-wearable XR device, can be implemented according to some examples. FIG. 8 provides a high-level functional block diagram of an example head-wearable apparatus 802 communicatively coupled to a mobile user device 838 and a server system 832 via a suitable network 840. One or more of the techniques described herein may be performed using the head-wearable apparatus 802 or a network of devices similar to those shown in FIG. 8.

The head-wearable apparatus 802 includes a camera, such as at least one of a visible light camera 812 and an infrared camera and emitter 814. The head-wearable apparatus 802 includes other sensors 816, such as motion sensors or eye tracking sensors. The user device 838 can be capable of connecting with head-wearable apparatus 802 using both a communication link 834 and a communication link 836. The user device 838 is connected to the server system 832 via the network 840. The network 840 may include any combination of wired and wireless connections.

The head-wearable apparatus 802 includes a display arrangement that has several components. The arrangement includes two image displays 804 of an optical assembly. The two displays include one associated with the left lateral side and one associated with the right lateral side of the head-wearable apparatus 802. However, it is noted that two displays is merely one example arrangement. The head-wearable apparatus 802 also includes an image display driver 808, an image processor 810, low power circuitry 826, and high-speed circuitry 818. The image displays 804 are for presenting images and videos, including an image that can provide a graphical user interface to a user of the head-wearable apparatus 802.

The image display driver 808 commands and controls the image display of each of the image displays 804. The image display driver 808 may deliver image data directly to each image display of the image displays 804 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 802 may include a frame and stems (or temples) extending from a lateral side of the frame, or another component to facilitate wearing of the head-wearable apparatus 802 by a user. The head-wearable apparatus 802 of FIG. 8 further includes a user input device 806 (e.g., touch sensor or push button) including an input surface on the head-wearable apparatus 802. The user input device 806 is configured to receive, from the user, an input selection to manipulate the graphical user interface of the presented image.

The components shown in FIG. 8 for the head-wearable apparatus 802 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 802. Left and right sides of the head-wearable apparatus 802 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 802 includes a memory 822 which stores instructions to perform a subset or all of the functions described herein. The memory 822 can also include a storage device. As further shown in FIG. 8, the high-speed circuitry 818 includes a high-speed processor 820, the memory 822, and high-speed wireless circuitry 824. In FIG. 8, the image display driver 808 is coupled to the high-speed circuitry 818 and operated by the high-speed processor 820 in order to drive the left and right image displays of the image displays 804. The high-speed processor 820 may be any processor capable of managing high-speed communications and operation of any general computing system needed for the head-wearable apparatus 802. The high-speed processor 820 includes processing resources needed for managing high-speed data transfers over the communication link 836 to a wireless local area network (WLAN) using high-speed wireless circuitry 824. In certain examples, the high-speed processor 820 executes an operating system such as a LINUX operating system or other such operating system of the head-wearable apparatus 802 and the operating system is stored in memory 822 for execution. In addition to any other responsibilities, the high-speed processor 820 executing a software architecture for the head-wearable apparatus 802 is used to manage data transfers with high-speed wireless circuitry 824. In certain examples, high-speed wireless circuitry 824 is configured to implement Institute of Electrical and Electronic Engineers (IEEE) 802.11 communication standards, also referred to herein as Wi-Fi™. In other examples, other high-speed communications standards may be implemented by high-speed wireless circuitry 824.

The low power wireless circuitry 830 and the high-speed wireless circuitry 824 of the head-wearable apparatus 802 can include short range transceivers (Bluetooth™) and wireless wide, local, or wide area network transceivers (e.g., cellular or Wi-Fi™). The user device 838, including the transceivers communicating via the communication link 834 and communication link 836, may be implemented using details of the architecture of the head-wearable apparatus 802, as can other elements of the network 840.

The memory 822 includes any storage device capable of storing various data and applications, including, among other things, camera data generated by the visible light camera 812, sensors 816, and the image processor 810, as well as images generated for display by the image display driver 808 on the image displays 804. While the memory 822 is shown as integrated with the high-speed circuitry 818, in other examples, the memory 822 may be an independent standalone element of the head-wearable apparatus 802. In certain such examples, electrical routing lines may provide a connection through a chip that includes the high-speed processor 820 from the image processor 810 or low power processor 828 to the memory 822. In other examples, the high-speed processor 820 may manage addressing of memory 822 such that the low power processor 828 will boot the high-speed processor 820 any time that a read or write operation involving memory 822 is needed.

As shown in FIG. 8, the low power processor 828 or high-speed processor 820 of the head-wearable apparatus 802 can be coupled to the camera (visible light camera 812, or infrared camera and emitter 814), the image display driver 808, the user input device 806 (e.g., touch sensor or push button), and the memory 822. The head-wearable apparatus 802 also includes sensors 816, which may be the motion components 1234, position components 1238, environmental components 1236, and biometric components 1232, e.g., as described below with reference to FIG. 12. In particular, motion components 1234 and position components 1238 are used by the head-wearable apparatus 802 to determine and keep track of the position and orientation (the "pose") of the head-wearable apparatus 802 relative to a frame of reference or another object, in conjunction with a video feed from one of the visible light cameras 812, using for example techniques such as structure from motion (SfM) or VIO.

In some examples, and as shown in FIG. 8, the head-wearable apparatus 802 is connected with a host computer. For example, the head-wearable apparatus 802 is paired with the user device 838 via the communication link 836 or connected to the server system 832 via the network 840. The server system 832 may be one or more computing devices as part of a service or network computing system, for example, that include a processor, a memory, and network communication interface to communicate over the network 840 with the user device 838 and head-wearable apparatus 802.

The user device 838 includes a processor and a network communication interface coupled to the processor. The network communication interface allows for communication over the network 840, communication link 834 or communication link 836. The user device 838 can further store at least portions of the instructions for implementing functionality described herein.

Output components of the head-wearable apparatus 802 include visual components, such as a display (e.g., one or more liquid-crystal display (LCD)), one or more plasma display panel (PDP), one or more light emitting diode (LED) display, one or more projector, or one or more waveguide. The image displays 804 of the optical assembly are driven by the image display driver 808. The output components of the head-wearable apparatus 802 further include acoustic components (e.g., speakers), haptic components (e.g., a vibratory motor), other signal generators, and so forth. The input components of the head-wearable apparatus 802, the user device 838, and server system 832, such as the user input device 806, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 802 may optionally include additional peripheral device elements. Such peripheral device elements may include biometric sensors, additional sensors, or display elements integrated with the head-wearable apparatus 802. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 836 from the user device 838 via the low power wireless circuitry 830 or high-speed wireless circuitry 824.

Figure 9:
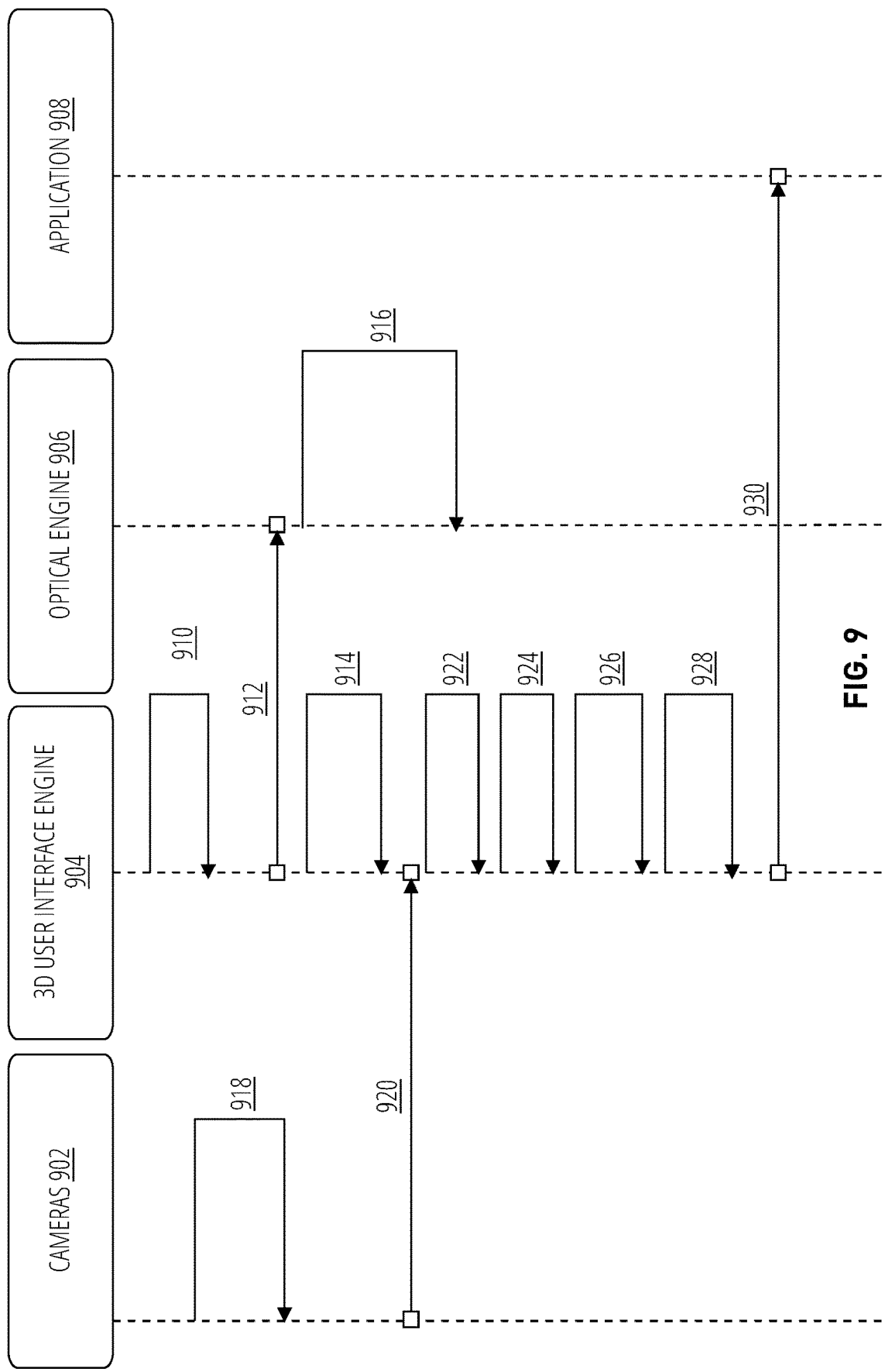
FIG. 9 is a sequence diagram illustrating a three-dimensional (3D) user interface generation and utilization process, according to some examples.
Figure 10:
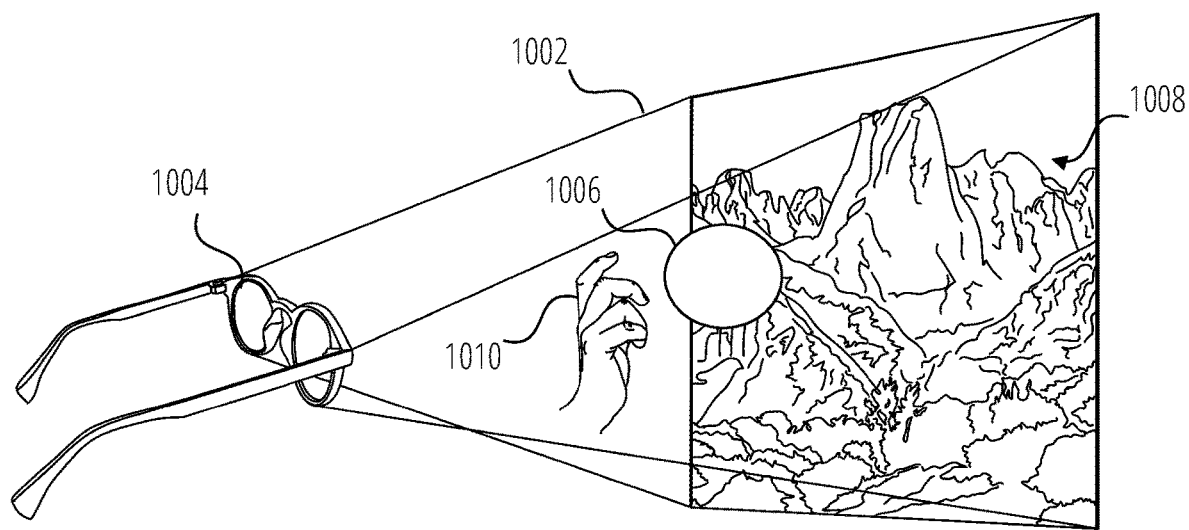
FIG. 10 illustrates a 3D user interface, according to some examples.

Referring now to FIG. 9 and FIG. 10, FIG. 9 depicts a sequence diagram of an example 3D user interface process and FIG. 10 depicts a 3D user interface 1002 of glasses 1004 in accordance with some examples. The glasses 1004 are a non-limiting example of an XR device.

During the process, a 3D user interface engine 904 generates 910 the 3D user interface 1002 including one or more virtual objects 1006 that constitute interactive elements of the 3D user interface 1002. A virtual object may be described as a solid in a 3D geometry having values in 3-tuples of X (horizontal), Y (vertical), and Z (depth). A 3D render of the 3D user interface 1002 is generated and 3D render data 912 is communicated to an optical engine 906 of the glasses 1004 and displayed 916 to a user of the glasses 1004.

The 3D user interface engine 904 generates 914 one or more virtual object colliders for the one or more virtual objects. One or more cameras 902 of the glasses 1004 generate 918 real world video frame data 920 of the real world 1008 as viewed by the user of the glasses 1004. Included in the real world video frame data 920 is hand position video frame data of one or more of the user's hands 1010 from a viewpoint of the user while wearing the glasses 1004 and viewing the projection of the 3D render of the 3D user interface 1002 by the optical engine 906. Thus the real world video frame data 920 include hand location video frame data and hand position video frame data of the user's hands 1010 as the user makes movements with their hands. The 3D user interface engine 904 utilizes the hand location video frame data and hand position video frame data in the real world video frame data 920 to extract landmarks 922 of the user's hands from the real world video frame data 920 and generates 924 landmark colliders for one or more landmarks on one or more of the user's hands. The landmark colliders are used to determine user interactions between the user and the virtual object by detecting collisions 926 between the landmark colliders and respective visual object colliders of the virtual objects. The collisions are used by the 3D user interface engine 904 to determine user interactions 928 by the user with the virtual objects. The 3D user interface engine 904 communicates user interaction data 930 of the user interactions to an application 908 for utilization by the application 908.

In some examples, the application 908 performs the functions of the 3D user interface engine 904 by utilizing various Application Programming Interfaces (APIs) and system libraries to receive and process the real world video frame data 920 and instruct the optical engine 906. The application 908 may be similar to the AR application 226 of FIG. 2.

In some examples, a user wears one or more sensor gloves on the user's hands that generate sensed hand position data and sensed hand location data that is used to generate the landmark colliders. The sensed hand position data and sensed hand location data are communicated to the 3D user interface engine 904 and used by the 3D user interface engine 904 in lieu of or in combination with the hand location video frame data and hand position video frame data to generate landmark colliders for one or more landmarks on one or more of the user's hands.

Figure 11:
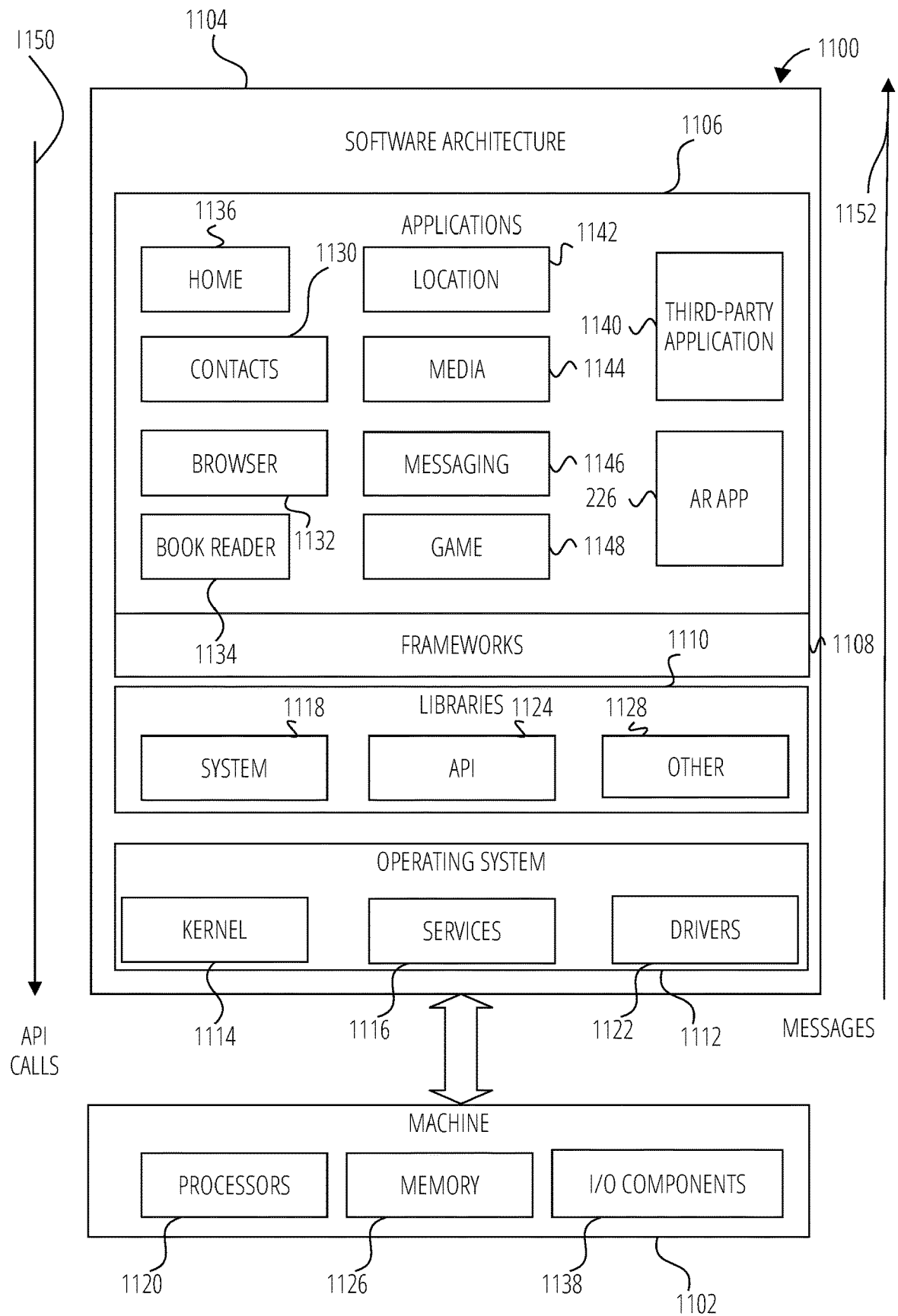
FIG. 11 is block diagram showing a software architecture within which the present disclosure may be implemented, according to some examples.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1110 provide a low-level common infrastructure used by the applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a high-level common infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In some examples, the applications 1106 may include a home application 1136, a contacts application 1130, a browser application 1132, a book reader application 1134, a location application 1142, a media application 1144, a messaging application 1146, a game application 1148, and a broad assortment of other applications such as a third-party application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In some examples, the third-party application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 11, the third-party application 1140 can invoke the API calls 1150 provided by the operating system 1112 to facilitate functionality described herein. The applications 1106 may include an AR application such as the AR application 226 described herein, according to some examples.

Figure 12:
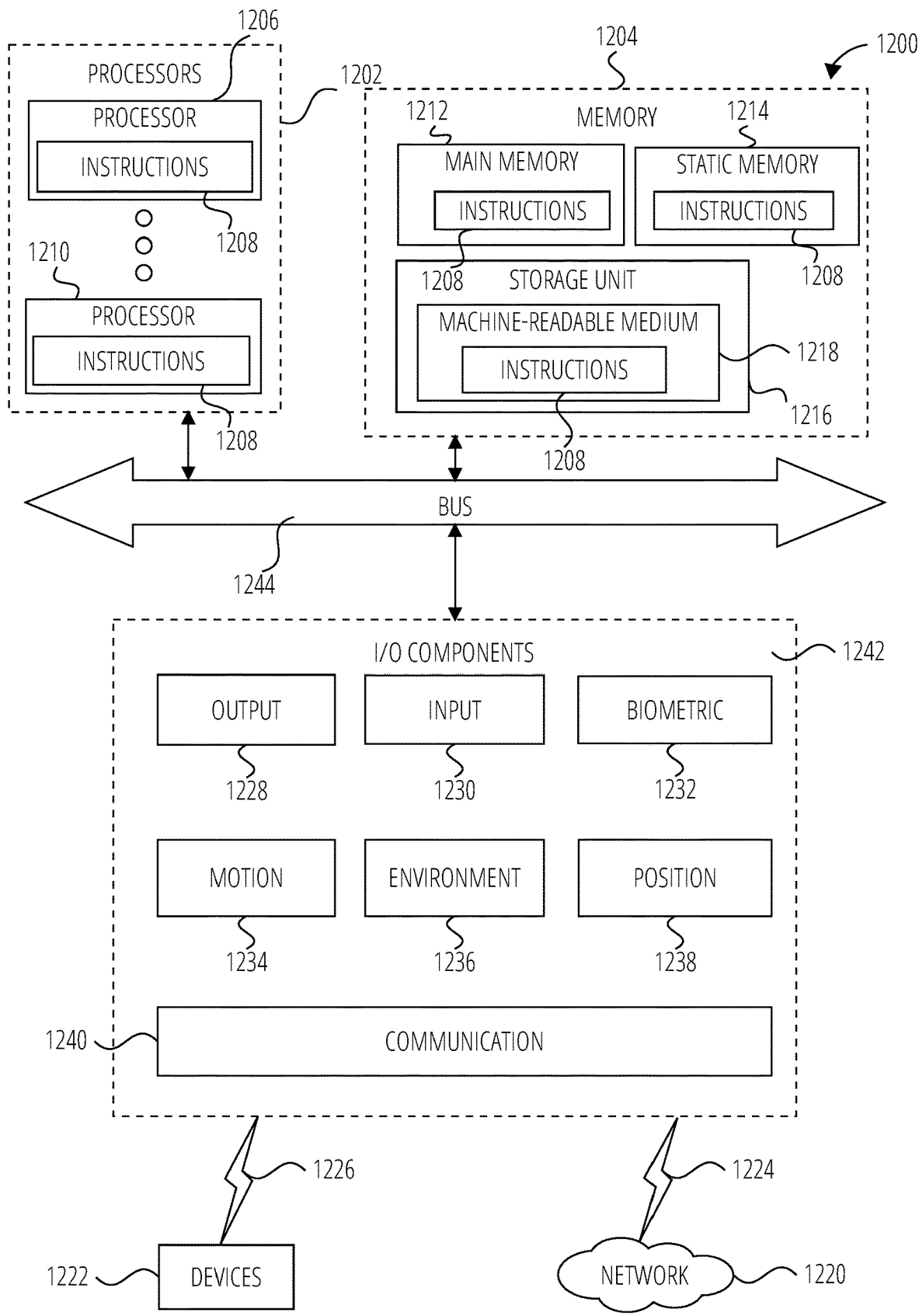
FIG. 12 is a diagrammatic representation of a machine in the form of a computer system within which a set of instructions may be executed for causing the machine to perform any one or more of the methodologies discussed herein, according to some examples.

FIG. 12 is a diagrammatic representation of a machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines.

In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), XR device, AR device, VR device, a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein.

The machine 1200 may include processors 1202, memory 1204, and I/O components 1242, which may be configured to communicate with each other via a bus 1244. In some examples, the processors 1202 (e.g., a Central Processing Unit (CPU), a Reduced Instruction Set Computing (RISC) processor, a Complex Instruction Set Computing (CISC) Processor, a Graphics Processing Unit (GPU), a Digital Signal Processor (DSP), an ASIC, a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, accessible to the processors via the bus 1244. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors, or any suitable combination thereof, during execution thereof by the machine 1200.

The I/O components 1242 may include a wide variety of components to receive input, provide output, produce output, transmit information, exchange information, capture measurements, and so on. The specific I/O components 1242 that are included in a particular machine will depend on the type of machine. For example, portable machines such as mobile phones may include a touch input device or other such input mechanisms, while a headless server machine will likely not include such a touch input device. It will be appreciated that the I/O components 1242 may include many other components that are not shown in FIG. 12. In various examples, the I/O components 1242 may include output components 1228 and input components 1230. The output components 1228 may include visual components (e.g., a display such as a plasma display panel (PDP), a light emitting diode (LED) display, a LCD, a projector, or a cathode ray tube (CRT)), acoustic components (e.g., speakers), haptic components (e.g., a vibratory motor, resistance mechanisms), other signal generators, and so forth. The input components 1230 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1242 may include biometric components 1232, motion components 1234, environmental components 1236, or position components 1238, among a wide array of other components. For example, the biometric components 1232 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1234 include acceleration sensor components (e.g., accelerometer), gravitation sensor components, rotation sensor components (e.g., gyroscope), and so forth. The environmental components 1236 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1242 further include communication components 1240 operable to couple the machine 1200 to a network 1220 or devices 1222 via a coupling 1224 and a coupling 1226, respectively. For example, the communication components 1240 may include a network interface component or another suitable device to interface with the network 1220. In further examples, the communication components 1240 may include wired communication components, wireless communication components, cellular communication components, Near Field Communication (NFC) components, Bluetooth™ components, Wi-Fi™ components, and other communication components to provide communication via other modalities. The devices 1222 may be another machine or any of a wide variety of peripheral devices (e.g., a peripheral device coupled via a USB).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as location via Internet Protocol (IP) geolocation, location via Wi-Fi™ signal triangulation, location via detecting an NFC beacon signal that may indicate a particular location, and so forth.

The various memories (e.g., memory 1204, main memory 1212, static memory 1214, and/or memory of the processors 1202) and/or storage unit 1216 may store one or more sets of instructions and data structures (e.g., software) embodying or used by any one or more of the methodologies or functions described herein. These instructions (e.g., the instructions 1208), when executed by processors 1202, cause various operations to implement disclosed examples.

The instructions 1208 may be transmitted or received over the network 1220, using a transmission medium, via a network interface device (e.g., a network interface component included in the communication components 1240) and using any one of a number of well-known transfer protocols (e.g., hypertext transfer protocol (HTTP)). Similarly, the instructions 1208 may be transmitted or received using a transmission medium via the coupling 1226 (e.g., a peer-to-peer coupling) to the devices 1222.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1200, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Conclusion

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure.

This Detailed Description, therefore, is not to be taken in a limiting sense, and the scope of various examples is defined only by the appended claims, along with the full range of equivalents to which such claims are entitled.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The term "operation" is used to refer to elements in the drawings of this disclosure for ease of reference and it will be appreciated that each "operation" may identify one or more operations, processes, actions, or steps, and may be performed by one or multiple components.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure.

This method of disclosure is not to be interpreted as reflecting an intention that the examples require more features than are expressly recited in each claim. Rather, as the following claims reflect, inventive subject matter may reside in less than all features of a single disclosed example. Thus the following claims are hereby incorporated into the Detailed Description, with each claim standing on its own as a separate example.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method performed by an extended reality (XR) device, the method comprising: capturing image data comprising one or more images of an extremity of a user; accessing external tracking data generated by an external sensor that is connected to the extremity of the user and communicatively coupled to the XR device; generating, based on the image data and the external tracking data, a forecast of a pose of the extremity; and using the forecast of the pose of the extremity to render virtual content for presentation to the user.

In Example 2, the subject matter of Example 1 includes, wherein the external sensor is connected to the extremity at an anchor point, and wherein generating the forecast of the pose of the extremity comprises: using the external tracking data to generate an anchor point forecast; and forecasting the pose of the extremity based on the anchor point forecast and the image data.

In Example 3, the subject matter of Example 2 includes, wherein the anchor point forecast comprises a forecast of a pose of a part of the extremity that is located at the anchor point.

In Example 4, the subject matter of any of Examples 1-3 includes, causing presentation of the virtual content via a display component of the XR device, the virtual content being positioned based on the forecast of the pose of the extremity.

In Example 5, the subject matter of any of Examples 1-4 includes, wherein the forecast of the pose of the extremity comprises a predicted position and orientation of the extremity expressed along six degrees of freedom.

In Example 6, the subject matter of any of Examples 1-5 includes, wherein the extremity comprises a hand of the user, and wherein the external sensor is connected so as to move together with the hand of the user relative to the XR device.

In Example 7, the subject matter of any of Examples 1-6 includes, wherein the external sensor comprises an Inertial Measurement Unit (IMU).

In Example 8, the subject matter of Example 7 includes, wherein the external tracking data comprises inertial data, the method further comprising: receiving the inertial data from the IMU; and generating the external tracking data based on the inertial data.

In Example 9, the subject matter of any of Examples 7-8 includes, wherein generating the forecast of the pose of the extremity comprises using the image data to adjust the external tracking data to compensate for IMU drift.

In Example 10, the subject matter of any of Examples 1-9 includes, wherein the one or images are captured by a camera of the XR device at a first sampling rate, and wherein the external sensor has a second sampling rate that is higher than the first sampling rate.

In Example 11, the subject matter of any of Examples 1-10 includes, wherein a first processing latency associated with the image data is higher than a second processing latency associated with the external tracking data.

In Example 12, the subject matter of any of Examples 1-11 includes, determining, based on the external tracking data, whether the extremity is in a field of view of the XR device.

In Example 13, the subject matter of Example 12 includes, wherein the one or images are captured by a camera of the XR device, the method further comprising: adjusting, based on determining whether the extremity is in the field of view of the XR device, a sampling rate of the camera.

In Example 14, the subject matter of any of Examples 1-13 includes, wherein generating the forecast of the pose of the extremity comprises: identifying, based on the external tracking data, a region of interest within the one or more images; and tracking the extremity with respect to the region of interest within the one or more images.

In Example 15, the subject matter of any of Examples 1-14 includes, wherein the XR device comprises a plurality of cameras, the method further comprising: selecting, based on the external tracking data, a subset of the cameras, wherein the image data is associated with the subset of the cameras.

In Example 16, the subject matter of any of Examples 1-15 includes, wherein the one or more images of the extremity of the user are captured during a user session in which the user is provided with an augmented reality (AR) experience via the XR device.

In Example 17, the subject matter of any of Examples 1-16 includes, wherein the extremity comprises a hand of the user, and wherein the external sensor is selected from the group consisting of: a finger-worn sensor; a wrist-worn sensor; and a hand-held mobile device.

In Example 18, the subject matter of any of Examples 1-17 includes, wherein the XR device is worn on a head of the user.

Example 19 is an extended reality (XR) device comprising: at least one processor; and at least one memory component storing instructions that, when executed by the at least one processor, configure the XR device to perform operations comprising: capturing image data comprising one or more images of an extremity of a user; accessing external tracking data generated by an external sensor that is connected to the extremity of the user and communicatively coupled to the XR device; generating, based on the image data and the external tracking data, a forecast of a pose of the extremity; and using the forecast of the pose of the extremity to render virtual content for presentation to the user.

Example 20 is a non-transitory computer-readable storage medium, the computer-readable storage medium including instructions that when executed by at least one processor of an extended reality (XR) device, cause the at least one XR device to perform operations comprising: capturing image data comprising one or more images of an extremity of a user; accessing external tracking data generated by an external sensor that is connected to the extremity of the user and communicatively coupled to the XR device; generating, based on the image data and the external tracking data, a forecast of a pose of the extremity; and using the forecast of the pose of the extremity to render virtual content for presentation to the user.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method performed by an extended reality (XR) device, the method comprising:
   capturing image data comprising one or more images of an extremity of a user, the image data captured at a first point in time;
   accessing external tracking data generated by an external sensor that is connected to the extremity of the user and communicatively coupled to the XR device, the external tracking data captured at least at a second point in time following the first point in time;
   generating, based on the image data and the external tracking data, a display-time forecast of a pose of the extremity for a third point in time following the second point in time; and
   using the display-time forecast of the pose of the extremity to render virtual content for display to the user at the third point in time, thereby compensating for a delay between the first point in time and the third point in time.

2. The method of claim 1, wherein the external sensor is connected to the extremity at an anchor point, and wherein generating the display-time forecast of the pose of the extremity comprises:
   using the external tracking data to generate an anchor point forecast for the third point in time; and
   forecasting the pose of the extremity for the third point in time based on the anchor point forecast and the image data.

3. The method of claim 2, wherein the anchor point forecast comprises a forecast of a pose of a part of the extremity that is located at the anchor point.

4. The method of claim 1, further comprising:
   causing the display of the virtual content via a display component of the XR device, the virtual content being positioned based on the display-time forecast of the pose of the extremity.

5. The method of claim 1, wherein the display-time forecast of the pose of the extremity comprises a predicted position and orientation of the extremity expressed along six degrees of freedom.

6. The method of claim 1, wherein the extremity comprises a hand of the user, and wherein the external sensor is connected so as to move together with the hand of the user relative to the XR device.

7. The method of claim 1, wherein the external sensor comprises an Inertial Measurement Unit (IMU).

8. The method of claim 7, wherein the external tracking data comprises inertial data, the method further comprising:
   receiving the inertial data from the IMU; and
   generating the external tracking data based on the inertial data.

9. The method of claim 7, wherein generating the display-time forecast of the pose of the extremity comprises using the image data to adjust the external tracking data to compensate for IMU drift.

10. The method of claim 1, wherein the one or more images are captured by a camera of the XR device at a first sampling rate, and wherein the external sensor has a second sampling rate that is higher than the first sampling rate.

11. The method of claim 1, wherein a first processing latency associated with the image data is higher than a second processing latency associated with the external tracking data.

12. The method of claim 1, further comprising:
   determining, based on the external tracking data, whether the extremity is in a field of view of the XR device.

13. The method of claim 12, wherein the one or more images are captured by a camera of the XR device, the method further comprising:
   adjusting, based on determining whether the extremity is in the field of view of the XR device, a sampling rate of the camera.

14. The method of claim 1, wherein generating the display-time forecast of the pose of the extremity comprises:
   identifying, based on the external tracking data, a region of interest within the one or more images; and
   tracking the extremity with respect to the region of interest within the one or more images.

15. The method of claim 1, wherein the XR device comprises a plurality of cameras, the method further comprising:
   selecting, based on the external tracking data, a subset of the cameras, wherein the image data is associated with the subset of the cameras.

16. The method of claim 1, wherein the one or more images of the extremity of the user are captured during a user session in which the user is provided with an augmented reality (AR) experience via the XR device.

17. The method of claim 1, wherein the extremity comprises a hand of the user, and wherein the external sensor is selected from the group consisting of: a finger-worn sensor; a wrist-worn sensor; and a hand-held mobile device.

18. The method of claim 1, wherein the XR device is worn on a head of the user.

19. An extended reality (XR) device comprising:
   at least one processor; and
   at least one memory component storing instructions that, when executed by the at least one processor, configure the XR device to perform operations comprising:
      capturing image data comprising one or more images of an extremity of a user, the image data captured at a first point in time;
      accessing external tracking data generated by an external sensor that is connected to the extremity of the user and communicatively coupled to the XR device, the external tracking data captured at least at a second point in time following the first point in time;
      generating, based on the image data and the external tracking data, a display-time forecast of a pose of the extremity for a third point in time following the second point in time; and
      using the display-time forecast of the pose of the extremity to render virtual content for display to the user at the third point in time, thereby compensating for a delay between the first point in time and the third point in time.

20. A non-transitory computer-readable storage medium, the computer-readable storage medium including instructions that when executed by at least one processor of an extended reality (XR) device, cause the at least one XR device to perform operations comprising:
- capturing image data comprising one or more images of an extremity of a user, the image data captured at a first point in time;
- accessing external tracking data generated by an external sensor that is connected to the extremity of the user and communicatively coupled to the XR device, the external tracking data captured at least at a second point in time following the first point in time;
- generating, based on the image data and the external tracking data, a display-time forecast of a pose of the extremity for a third point in time following the second point in time; and
- using the display-time forecast of the pose of the extremity to render virtual content for display to the user at the third point in time, thereby compensating for a delay between the first point in time and the third point in time.

* * * * *